United States Patent [19]
Umemura et al.

[11] Patent Number: 6,125,419
[45] Date of Patent: Sep. 26, 2000

[54] BUS SYSTEM, PRINTED CIRCUIT BOARD, SIGNAL TRANSMISSION LINE, SERIES CIRCUIT AND MEMORY MODULE

[75] Inventors: Masaya Umemura, Fujisawa; Hideki Osaka, Hiratsuka; Toshitsugu Takekuma, Ebina, all of Japan

[73] Assignee: Hitachi, Ltd., Tokyo, Japan

[21] Appl. No.: 08/874,721

[22] Filed: Jun. 13, 1997

[30] Foreign Application Priority Data

Jun. 13, 1996 [JP] Japan .................................. 8-152592
Oct. 25, 1996 [JP] Japan .................................. 8-283853

[51] Int. Cl.$^7$ .................................................. G06F 13/00
[52] U.S. Cl. ................................. 710/129; 710/128
[58] Field of Search ....................... 333/100, 22; 326/30; 710/100, 107, 128, 129

[56] References Cited

U.S. PATENT DOCUMENTS

| | | | |
|---|---|---|---|
| 5,548,226 | 8/1996 | Takekuma et al. | 326/30 |
| 5,568,063 | 10/1996 | Takekuma et al. | 326/30 |
| 5,663,661 | 9/1997 | Dillon et al. | 326/30 |
| 5,668,834 | 9/1997 | Takekuma et al. | 375/257 |

FOREIGN PATENT DOCUMENTS 1-164145 6/1989 Japan .
3-71711 3/1991 Japan .

OTHER PUBLICATIONS

"A Proposal for an Implementation of IEEE P1596.4 'Ramlink' Optimized for Small (Single–Board) Memory Systems", Hans Wiggers Memory Technology Center, Mar. 23, 1995, Hewlett Packard.

*Primary Examiner*—Ayaz R. Sheikh
*Assistant Examiner*—David A. Wiley
*Attorney, Agent, or Firm*—Antonelli, Terry, Stout & Kraus, LLP

[57] ABSTRACT

There are provided plural synchronous RAMs, a memory controller, a bus for inputting the signal output from the memory controller 1a to the synchronous RAMs, and a bus for inputting the signals output from the synchronous RAMs to the memory controller. Each of the buses has a main line and two stub lines connected to the trunk like. Each of the synchronous RAMs is connected to the corresponding stub line so that the sum of the bus length of the bus between the synchronous RAM and the memory controller and the bus length of the bus between the synchronous RAM and the memory controller is substantially constant among all of said synchronous RAMs. Therefore, the signal transmission time between the bus master and the plural bus slaves can be shortened without increasing the number of pins of the bus master while keeping the signal transmission time substantially constant among the plural bus slaves.

27 Claims, 19 Drawing Sheets

BUS SYSTEM, PRINTED CIRCUIT BOARD, SIGNAL TRANSMISSION LINE, SERIES CIRCUIT AND MEMORY MODULE

BACKGROUND OF THE INVENTION

1. Field of the Invention

The present invention relates to a bus system, and particularly to a bus system and a printed circuit board for use in synchronous type control of an information processing device.

2. Description of Related Art

SyncLink of IEEE1596.4 has been known as a standard for a synchronous memory and a synchronous memory system. The synchronous memory system to which the standard is applied will be hereunder described with reference to the accompanying drawings.

FIG. 32 shows the construction of a synchronous memory system to which SyncLink is applied.

The synchronous memory system to which SyncLink is applied comprises plural synchronous RAMs $104a_{\#1}$ to $104a_{\#n}$ (hereinafter merely referred to as "synchronous RAM $104a$, in some cases), a memory controller $101a$ for controlling write-in and read-out of data into and from the synchronous RAM $104a$, an address bus $105a$, and a data bus $106a$.

The address bus $105a$ is used to input into an input buffer $1042a$ of the synchronous RAM $104a$, addresses, commands, write data and a synchronous clock signal which are output from an output buffer $1012a$ of the memory controller $101a$, and it comprises a bus line for the address, the commands and the write data, and a synchronous clock line for the synchronous clock signals.

The data bus $106a$ is used to input into the input buffer $1014a$ of the memory controller $101a$ read data which are output from an output buffer $1044a$ of the synchronous RAM $104a$.

The address bus $105a$ is used in ascending numeric order of the synchronous RAMs $104a$ to the memory controller $101a$ (i.e., the order from #1 to #n). On the other hand, the data bus $106a$ is used in descending numeric order of the synchronous RAMs $104a$ to the memory controller $101a$ (i.e., the order from #n to #1). With this setting, the sum of the bus length of the address bus $105a$ between the memory controller $101a$ and the synchronous RAM $104a$ and the bus length of the data bus $106a$ between the memory controller $101a$ and the synchronous RAM $104a$ is set to a substantially equal value among all the synchronous RAMs $104a_{\#1}$ to $104a_{\#n}$.

According to the synchronous memory system to which the SyncLink as described above is applied, in response to the synchronous clock which is output onto the synchronous clock line of the address bus $105a$ from the memory controller $101a$, the synchronous RAM $104a$ latches the address, the command and the write data which are output onto a bus of the address bus $105b$ from the memory controller $101a$, whereby the synchronous transmission of the address, the command and the write data can be achieved. Further, the sum of the bus length of the address bus $105a$ between the memory controller $101a$ and the synchronous RAM $104a$ and the bus length of the data bus $106a$ between the memory controller $101a$ and the synchronous RAM $104a$ is set to be substantially equal among all the synchronous RAMs $104a_{\#1}$ to $104a_{\#n}$, so that the memory access latency to each synchronous RAM $104a$ of the memory controller $101a$ can be set to a substantially equal value.

SUMMARY OF THE INVENTION

However, in the synchronous memory system thus constructed, as the number of synchronous RAMs $104a$ is increased, the bus length of each of the address bus $105a$ and the data bus $106a$ also increases, and thus the transmission time of the signal on each bus is longer. Consequently, the memory access latency of the memory controller $101a$ to each synchronous RAM $104a$ becomes long.

In order to shorten the propagation time on each bus, there may be considered a method for enhancing the current drivabiliity of the memory controller $101a$ and the output buffer $1012a$ of the synchronous RAM $104a$. According to this method, however, ringing noise due to reflection on the bus increases, and thus an expected shortening effect of the propagation time cannot be obtained. Rather, the enhancement of the current drivabiliity causes an increase of chip die due to enlargement of the area of the output buffer. In addition, the electromagnetic interference is increased due to increase of the current amount, and thus a new countermeasure is required. Therefore, this method is unfavorable.

According to SyncLink, there is also proposed a synchronous memory system when the capacity of a synchronous RAM is extended. In this synchronous memory system, as shown in FIG. 33, a bus system comprising the address bus $105b$ and the data bus $106b$ is connected to the synchronous RAMs $104b_{\#1}$ to $104b_{\#}$n, and a bus system comprising the address bus $105c$ and the data bus $106c$ is connected to the synchronous RAMs $104c_{\#1}$ to $104c_{\#n}$. By providing the two bus systems as described above, the number of synchronous RAMs to be connected to each bus is reduced, whereby the bus length of each bus can be shortened. However, the memory controller $101b$ must be provided with the output buffers $1012b$ and $1012c$ corresponding to the address buses $105b$ and $105c$ respectively and with the input buffers $1014b$ and $1014c$ corresponding to the data buses $106b$ and $106c$ respectively, so that the memory controller $101b$ must be designed in a large size and the number of pins is increased.

The present invention has been made on the basis of the above situation, and has as its object to provide a bus system and a printed circuit board which can shorten a signal transmission time between a bus master and each of plural bus slaves controlled by the bus master while keeping the signal transmission time over all the connections of the bus master and the respective bus slaves substantially constant without increasing the number of pins of the bus master.

In order to attain the above object, there is provided a bus system having plural bus slaves, a bus master for controlling the plural bus slaves, a first bus for inputting a signal output from the bus master to the bus slaves, and a second bus for inputting signals output from the bus slaves to the bus master, wherein each of the first and second buses includes a main line connected to the bus master; plural stub lines each of which is connected to the main line and connected to at least one bus slave; and the bus slave is connected to the corresponding stub lines of the first bus and the second bus so that the sum of the length of the first bus between the bus slave and the bus master and the length of the second bus between the bus slave and the bus master is substantially equal among all the bus slaves.

Impedance matching may be performed on the first bus so that the signal output from the bus master produces no reflection wave at the connection points between the main line and the plural stub lines of the first bus.

Further, impedance matching may be performed on the second bus so that reflection wave occurring when the signals output from the plural bus slaves are input to the bus master produces no reflection wave again at the connection points between the trunk of the second bus and the plural stub lines of the second bus.

When each of the plural bus slaves is connected to the corresponding stub line through sub line, impedance matching may be performed on the sub line and the stub line connected to the stub line so that the signal output from the bus slave which is connected to the stub line, or reflection wave occurring at the bus slave concerned produces no reflection wave at the connection point between the sub line and the stub line.

Further, a matching load having an impedance which is substantially equal to the characteristic impedance of the stub line concerned may be connected to the terminal of the stub line concerned.

The printed circuit board of the present invention includes thereon plural bus slaves, a bus master for controlling the plural bus slaves, a first bus for inputting the signal output from the bus master to the bus slaves and a second bus for inputting the signals output from the bus slaves to the bus master, wherein the bus master is disposed on the substantially center portion; the plural bus slaves are divided into two groups so that the two groups are symmetrically disposed at the upper and lower sides with respect to the bus master; the first bus includes a first stub line connected to each of the bus slaves disposed at the lower side of the bus master, a second stub line connected to each of the bus slaves disposed at the upper side of the bus master; and a first main line which is connected to the bus master at one end portion thereof and connected to the first stub line and the second stub line at the other end portion, the first stub line and the second stub line being formed substantially symmetrically at the upper and lower sides with respect to the bus master, and the second bus includes a third stub line which is connected to each of the bus slaves disposed at the lower side of the bus master in the opposite order to the first stub line, a fourth stub line which is connected to each of the bus slaves disposed at the upper side of the bus master in the opposite order to the second stub line, and a second main line which is connected to the bus master at one end portion thereof and connected to the third and fourth stub lines at the other end portion, the third and fourth stub lines being formed substantially symmetrically at the upper and lower sides with respect to the bus master.

DETAILED DESCRIPTION OF THE PREFERRED EMBODIMENTS

A first embodiment according to the present invention will be described with reference to the accompanying drawings.

Figure 1:
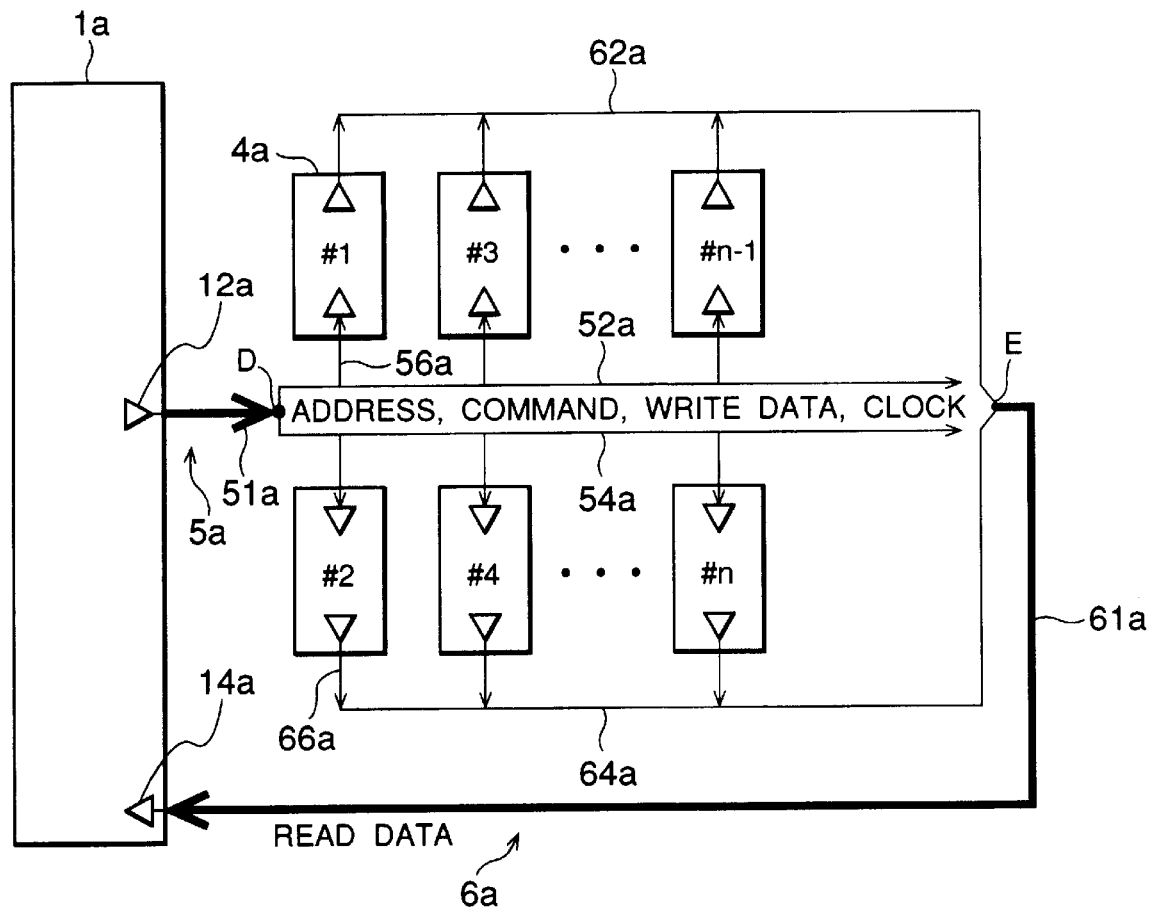
FIG. 1 is a diagram showing a synchronous memory system according to a first embodiment of the present invention.
Figure 2:
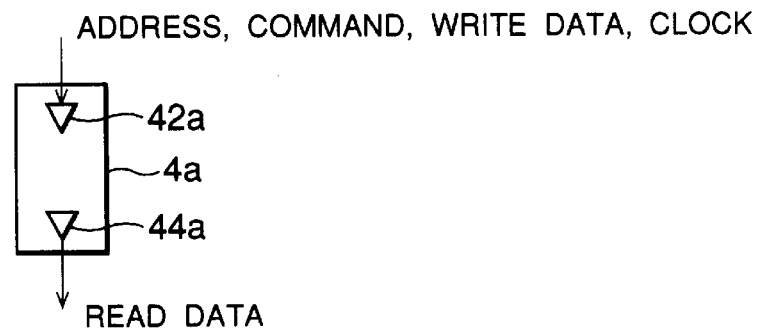
FIG. 2 is a block diagram showing a synchronous RAM shown in FIG. 1.

FIG. 1 is a diagram showing the construction of a synchronous memory system according to a first embodiment of the present invention, and FIG. 2 is a block diagram showing a synchronous RAM shown in FIG. 1.

As shown in FIG. 1, the synchronous memory system of this embodiment includes synchronous RAMs $4a_{\#1}$ to $4a_{\#n}$ whose number is even (hereinafter, in some cases, merely referred to as "synchronous RAM $4a$"), a memory controller $1a$ for controlling the write-in and read-out of data into/from the synchronous RAMs $4a$, an address command clock write data bus $5a$, and a read data bus $6a$.

The memory controller $1a$ outputs addresses, commands write data for controlling the write-in and read-out operation of the synchronous RAMs $4a$, and synchronizing clock signals from an output buffer $12a$ thereof. Further, the memory controller $1a$ receives, through an input buffer $14a$ thereof, read data which are output from the synchronous RAMs $4a$.

As shown in FIG. 2, the synchronous RAM $4a$ includes an input buffer $42a$ for receiving an address, a command, write data and a synchronizing clock signal, an output buffer $44a$ for outputting the read data, and a memory portion comprising a memory cell, a sense amplifier, a sequencer, etc. (not shown). In response to the received synchronizing clock as a trigger, the synchronous RAM $4a$ latches the address, the command and the write data, and performs the write-in operation of the latched write data into the memory cell or the read-out operation of the data corresponding to the latched address from the memory cell in accordance with the latched address and the command.

The address command clock write data bus $5a$ is used to input to the input buffer $42a$ of the synchronous RAM $4a$ an address, a command, write data and a synchronizing clock signal which are output from the output buffer $12a$ of the memory controller $1a$. Further, as shown in FIG. 1, a main line $51a$ of the address command clock write data bus $5a$ is branched into two stub lines $52a$ and $54a$ at a dividing point D. The odd-numbered synchronous RAMs $4a_{\#i}$ (i=1,3, ... , n-1) are connected to the stub line $52a$ through respective sub lines $56a$ at substantially equal intervals, and the even-numbered synchronous RAMs $4a_{\#j}$ (j=2, 4, ... , n) are connected to the stub line $54a$ through respective sub lines $56a$ at substantially equal intervals. With this connection arrangement, the length of the stub line $52a$ is substantially equal to the length of the stub line $54a$.

The read data bus $6a$ is used to input to the input buffer $14a$ of the memory controller $1a$, the read data which are output from the output buffer $44a$ of the synchronous RAM $4a$. As in the case of the address command clock write data bus $5a$, the main line $61a$ of the read data bus $6a$ is branched into two stub lines $62a$ and $64a$ at a dividing point E. Odd-numbered synchronous RAMs $4a_{\#i}$ (i=1,3, ... ,n-1) are connected through respective sub lines $66a$ to the stub line $62a$ at substantially equal intervals, and even-numbered synchronous RAMs $4a_{\#j}$ (j=2, 4, ... , n) are connected through respective sub lines $66a$ to the stub line $64a$ at substantially-equal intervals. With this connection arrangement, the length of the stub line $62a$ and the length of the stub line $64a$ are set to be substantially equal to each other.

Each of the stub lines $52a$ and $54a$ of the address command clock write data bus $5a$ is set so that the connection order of the synchronous RAMs $4a$ to the memory controller $1a$ is an ascending order (i.e., the order of #1, #3, ... , #n-1 for the stub line $52a$, and the order of #2, #4, ... , #n for the stub line $54a$). On the other hand, each of the stub lines $62a$ and $64a$ of the read data bus $6a$ is set so that the connection order of the synchronous RAMs $4a$ to the memory controller $1a$ is a descending order (i.e., the order of #n-1, #n-3, ... , #1 for the stub line $62a$, and the order of #n, #n31 2, ... , #2 for the stub line $64a$). As described above, the length of the stub line $52a$ and the length of the stub line $54a$ of the address command clock write data bus $5a$ are set to be substantially equal to each other, and the length of the stub line $62a$ and the length of the stub line $64a$ of the read data bus $6a$ are set to be substantially equal to each other, whereby each sum of the bus length of the address command clock write data bus $5a$ between the memory controller $1a$ and one of the synchronous RAMs $4a$ and the bus length of the read data bus $6a$ between the memory controller $1a$ and the synchronous RAM $4a$ concerned is set to be substantially equal among all the synchronous RAMs $4a_{\#1}$ to $4a_{\#n}$.

According to the synchronous memory system of this embodiment, in response to the synchronizing clock output from the memory controller $1a$ onto the address command clock write data bus $5a$, the synchronous RAM $4a$ latches the address, the command and the write data which are output onto the address command clock write data bus $5a$ from the memory controller $1a$, whereby the synchronous transmission of the address, the command and the write data is achieved.

Further, the sum of the bus length of the address command clock write data bus $5a$ between the memory controller $1a$ and the synchronous RAM $4a$ and the bus length of the read data bus $6a$ between the memory controller $1a$ and the synchronous RAM $4a$ is set to be substantially equal among all the synchronous RAMs $4a_{\#1}$ to $4_{a\#n}$, whereby the memory access latency from the time when the output buffer $12a$ of the memory controller $1a$ outputs an address and a command indicating "address" and "read" until the time when the input buffer $14a$ of the memory controller $1a$ receives the data of the address concerned is set to a substantially same value among all the synchronous RAMs $4a_{\#1}$ to $4a_{\#n}$.

Figure 32:
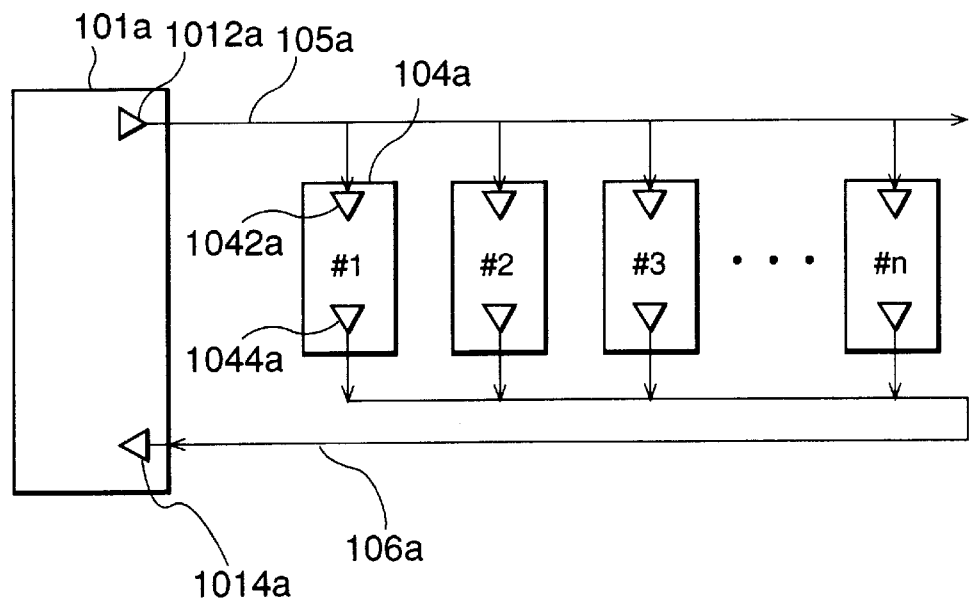
FIG. 32 is a diagram showing a synchronous memory system to which SyncLink is applied.
Figure 33:
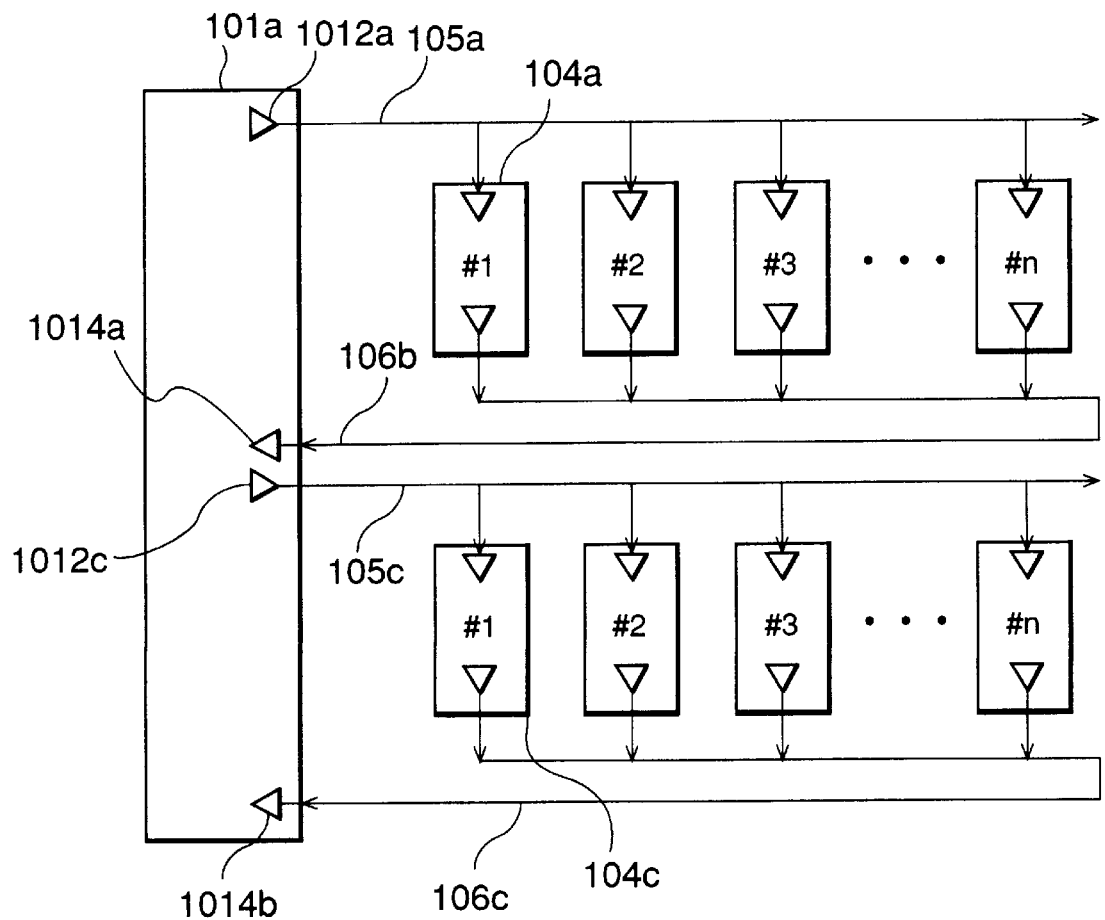
FIG. 33 is a diagram showing the construction of the synchronous memory system to which SyncLink is applied when the capacity is extended.

Further, as shown in FIG. 1, each of the address command clock write data bus $5a$ and the read data bus $6a$ is branched into two stub lines, and one stub line is connected to the odd-numbered synchronous RAMs $4a$ while the other stub line is connected to the even-numbered synchronous RAMs $4a$, whereby the maximum bus length of the address command clock write data bus $5a$, the read data bus $6a$ between the memory controller $1a$ and the synchronous RAMs $4a$ can be shortened to about a half of that of the conventional synchronous memory system shown in FIG. 32. Accordingly, the memory access latency of the memory controller $1a$ to each synchronous RAM $4a$ can be shortened. Further, unlike the conventional synchronous memory system shown in FIG. 33, it is unnecessary to provide the memory controller with the two output buffers corresponding to the two respective address command clock write data buses, and with the two input buffers corresponding to the two data buses. Accordingly, the increase in size of the memory controller can be prevented, and the increase of the number of pins of the memory controller can be also prevented.

Next, the construction of the address command clock write data bus $5a$ of this embodiment will be described with reference to the accompanying drawings.

Figure 3:
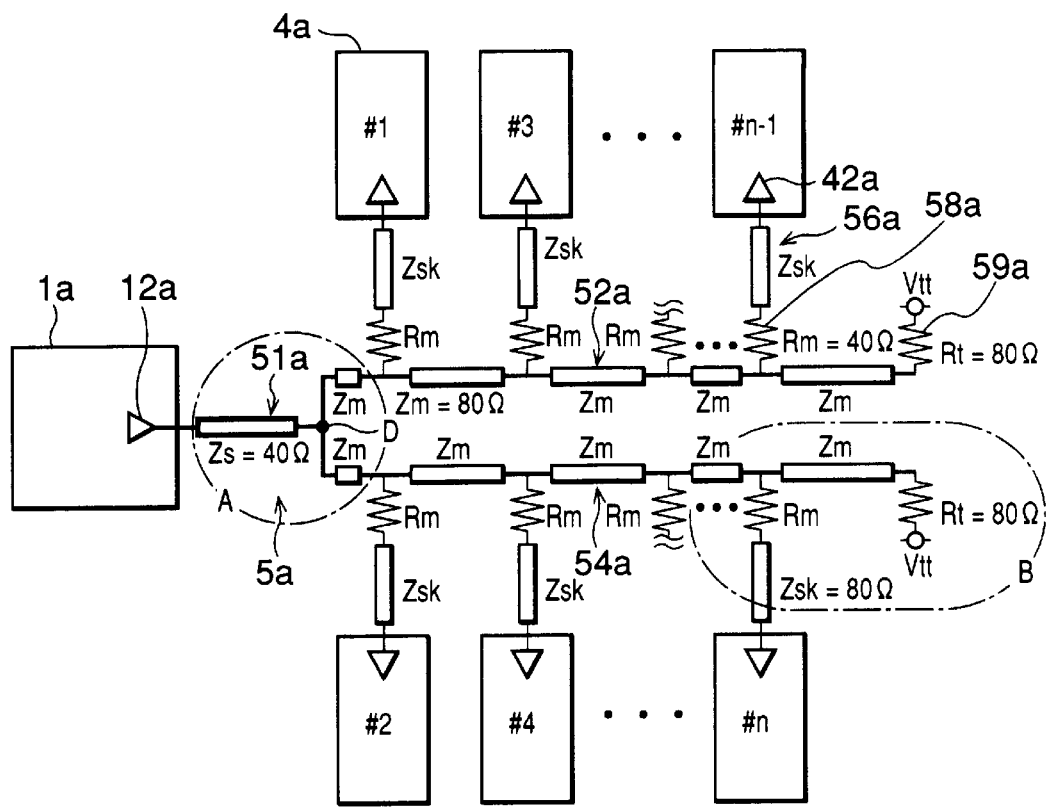
FIG. 3 is a diagram showing an address command clock write data bus shown in FIG. 1.
Figure 4:
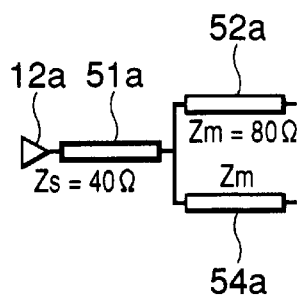
FIG. 4 is an enlarged view of a portion A of FIG. 3.
Figure 5:
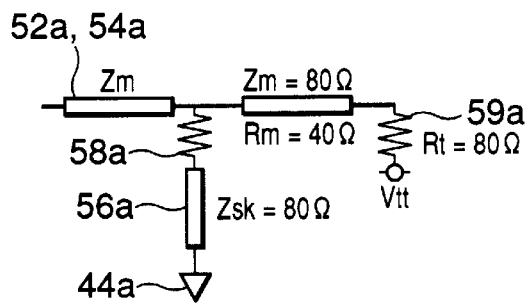
FIG. 5 is an enlarged view of a portion B of FIG. 3.

FIG. 3 is a diagram showing the construction of the address command clock write data bus shown in FIG. 1, FIG. 4 is an enlarged view of a portion A of FIG. 3, and FIG. 5 is an enlarged view of a portion B of FIG. 3.

A wiring pattern for a printed circuit board is used as the address command clock write data bus 5a of this embodiment. The characteristic impedance of the wiring pattern is mainly dependent on parasitic capacitance. The value of the parasitic capacitance is determined by the material and structure of the substrate, the width of the wiring pattern, the distance between the pattern and the ground or a power source line, or the like. Ordinarily, the value of the parasitic capacitance is equal to about 40 to 100 Ω.

In this embodiment, as shown in FIGS. 3 and 4, a wiring pattern having a characteristic impedance Zs of 40 Ω is used for the main line 51a. Further, as shown in FIGS. 3 to 5, a wiring pattern having a characteristic impedance of 80 Ω is used for each of the stub lines 52a and 54a, and the terminal of each of the stub lines 52a and 54a is connected through a terminal resistor 59a having a resistance value Rt of 80 Ω to a line Vtt. Further, as shown in FIGS. 3 and 5, a wiring pattern having a characteristic impedance Zsk of 80 Ω is used for the sub line 56a, and each sub line 56a is connected to the stub lines 52a, 54a through a matching resistor (termination resistor) 58a having a resistance value Rm of 40 Ω.

Next, the electrical characteristic of the address command clock write data bus 5a at the dividing point D in FIG, 1, the electrical characteristic at the connection point between the stub line 52a,54a and the stub line 56a, and the electrical characteristic at the terminal of the stub line 52a, 54a will be described.

First, the electrical characteristic at the dividing point D in FIG. 1 will be described.

In the address command clock write data bus 5a of this embodiment, a wiring pattern having a characteristic impedance Zs of 40 Ω is used for the main line 51a, and a wiring pattern having a characteristic impedance Zm of 80 Ω is used for the stub line 52a, 54a. Accordingly, the characteristic impedance Zs of the main line 51a is coincident with the composite characteristic impedance Zm/2 of the stub lines 52a and 54a, so that impedance matching can be performed at the dividing point D. Accordingly, an electrical signal which is output from the output buffer 12a of the memory controller 1a produce no undesired reflection wave at the dividing point D.

As described above, the characteristic impedance of the wiring pattern is dependent on the width of the wiring pattern, the distance between the pattern and the ground or the power source line, etc. Therefore, there may be considered such a case that the characteristic impedance Zs of the main line 51 a cannot be set to be coincident with the composite impedance Zm/2 of the stub lines 52a and 54a in accordance with the pattern design. In such a case, a matching resistor for compensating for the difference between the composite characteristic impedance Zm/2 of the stub lines 52a and 54a and the characteristic impedance Zs of the main line 51a is inserted between the main line 51a and the dividing point D to thereby perform impedance matching at the dividing point D.

Next, the electrical characteristic at the connection point between the stub line 52a, 54a and the sub line 56a will be described.

In the address command clock write data bus 5a of this embodiment, a wiring pattern having a characteristic impedance Zsk of 80 Ω is used for the sub line 56a, and each sub line 56a is connected to the corresponding stub line 52a, 54a through a matching resistor 58a having a resistance value Rm of 40 Ω. Since the characteristic impedance Zm of the stub line 52a, 54a is equal to 80 Ω, the characteristic impedance Zsk of the sub line 56a is apparently coincident with the composite characteristic impedance (Zm/2+Rm) of the composite characteristic impedance Zm/2 of the two branched stub lines 52a and 54a and the resistance value Rm of the matching resistor 58a when viewed from the sub line 56a side. Therefore, according to this embodiment, impedance matching can be performed at the connection point between the stub line 52a, 54a and the sub line 56a.

When the electrical signal output from the output buffer 12a of the memory controller 1a arrives at the input buffer 42a of the synchronous RAM 4a, it produces a reflection wave due to the difference in characteristic impedance at the contact point between the input buffer 42a and the sub line 56a, and the reflection wave thus produced arrives at the connection point between the stub line 52a, 54a and the sub line 56a. However, according to this embodiment, since impedance matching at the connection point is performed, the reflection wave can be prevented from further producing reflection wave at the connection point. Accordingly, the reflection wave can be prevented from being repetitively and alternately produced at the connection point between the sub line 56a and the synchronous RAM 4a and at the connection point between the sub line 56a and the stub line 52a, 54a connected to the sub line 56a and thus the amplitude of the electrical signal input to the input buffer 42a is stepwise increased. Therefore, the potential establishing time of the electrical signal input to the input buffer 42a can be shortened, and thus the memory access latency to the synchronous RAM 4a can be shortened.

Further, the amount of current to be supplied to the sub line 56a can be reduced by the matching resistor 58a, whereby a large current can be prevented from varying sharply and undesired electromagnetic interference (EMI), etc. can be reduced.

The matching resistor 58a constitutes an RC circuit in combination with the parasitic capacitance of the wiring pattern used as the sub line 56a and the parasitic capacitance of the synchronous RAM 4a. The time constant of the RC circuit is ordinarily shorter than the bus cycle of a signal propagating onto the address command clock write data bus 5a, and longer than the rise and fall times of the signal, so that an electrical signal having a smooth waveform which reflects the waveform of the electrical signal output from the output buffer 12a of the memory controller 1a can be input to the input buffer 42a.

Next, the electrical characteristic at the terminals of the stub lines 52a, 54a will be described.

In the address command clock write data bus 5a of this embodiment, each of the terminals of the stub lines 52a and 54a is connected to the line Vtt through the terminal resistor 59a having a resistance value Rt of 80 Ω. Accordingly, the characteristic impedance Zm of the stub line 52a, 54a is coincident with the resistance value Rt of the terminal resistor 59a, so that impedance matching can be performed at each of the terminals of the stub lines 52a and 54a. Therefore, the electrical signal and the reflection wave which arrive at the terminals of the stub lines 52a and 54a can be absorbed by the terminal resistor 59a.

Next, the construction of the read data bus 6a of this embodiment will be described with reference to the drawings.

Figure 6:
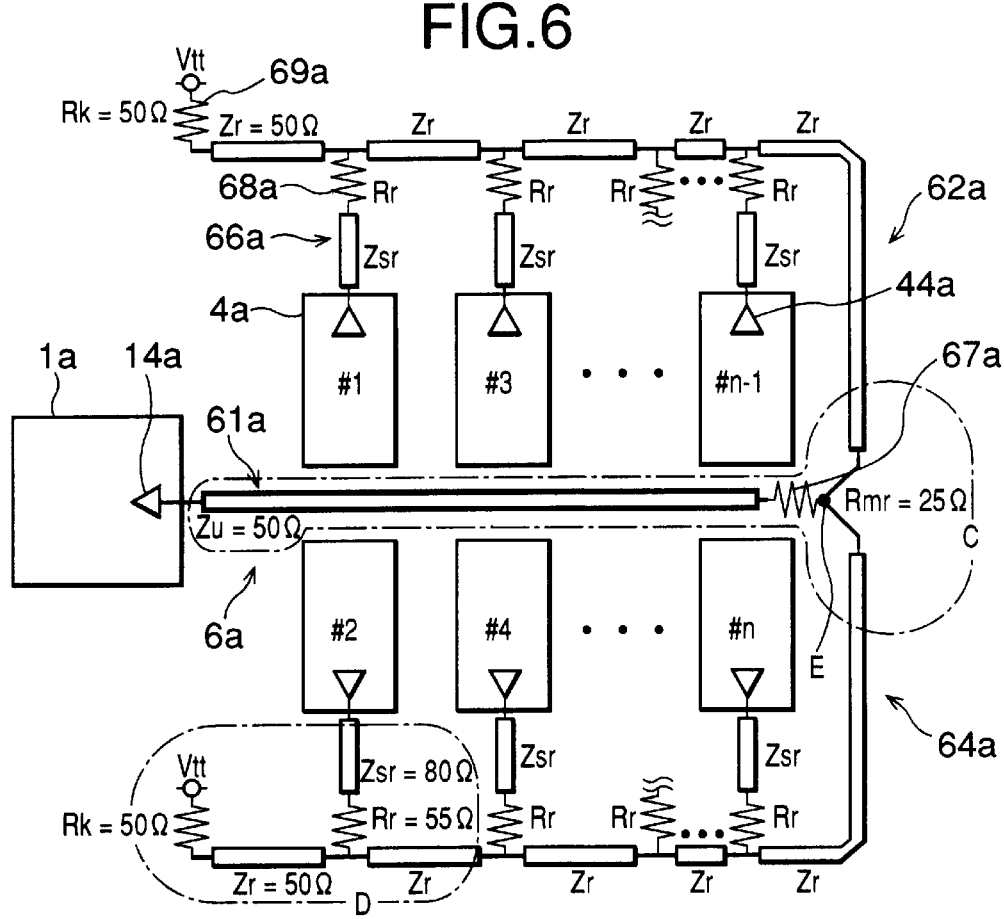
FIG. 6 is a diagram showing a data bus of FIG. 1.
Figure 7:
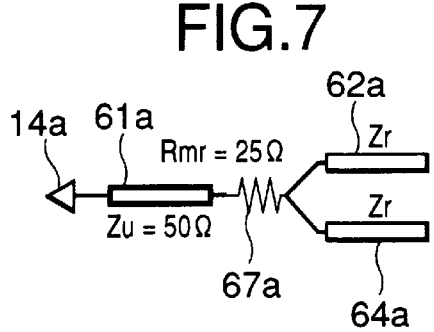
FIG. 7 is an enlarged view of a portion C of FIG. 6.
Figure 8:
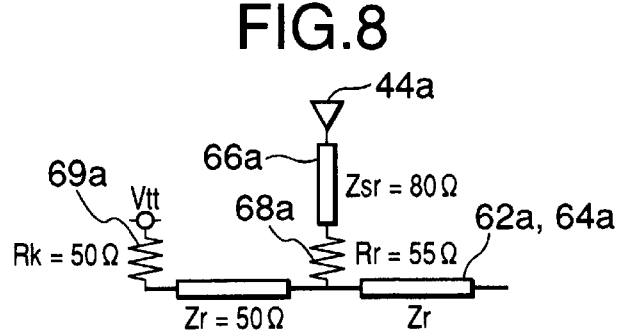
FIG. 8 is an enlarged view of a portion D of FIG. 6.

FIG. 6 is a diagram showing the construction of the read data bus shown in FIG. 1, FIG. 7 is an enlarged view showing a portion C of FIG. 6, and FIG. 8 is an enlarged view showing a portion D of FIG. 6.

As in the case of the address command clock write data bus 5a, a wiring pattern of a printed circuit board is used for the read data bus 6a of this embodiment. As described above, the characteristic impedance of the wiring pattern is ordinarily set to about 40 to 100 Ω. In this embodiment, as shown in FIGS. 6 and 7, a wiring pattern having a characteristic impedance Zu of 50 Ω is used for the main line 61a, and a wiring pattern having a characteristic impedance Zr of 50 Ω is used for each of the stub lines 62a and 64a. Further, a matching resistor having a resistance value Rmr of 25 Ω is inserted between the main line 61a and the dividing point E. Further, as shown in FIGS. 6 and 8, each of the terminals of the stub lines 62a and 64a is connected to the line Vtt through a terminal resistor 69a having a resistance value Rk of 50 Ω. Still further, a wiring pattern having a characteristic impedance Zsr of 80 Ω is used for the sub line 66a, and each sub line 66a is connected through a matching resistor 68a having a resistance value Rr of 55 Ω to the corresponding stub line 62a (64a).

Next, the electrical characteristic at the connection point between the stub line 62a, 64a and the sub line 66a of the read data bus 6a, the electrical characteristic at the dividing point E and the electrical characteristic at the terminals of the stub lines 62a and 64a will be described.

First, the electrical characteristic at the connection point between the stub line 62a, 64a and the sub line 66a will be described.

In the read data bus 6a of this embodiment, a wiring pattern having a characteristic impedance Zsr of 80 Ω is used for the sub line 66a, and each sub line 66a is connected through the matching resistor 68a having a resistance value Rr of 55 Ω to the corresponding stub line 62a (64a). Here, since the characteristic impedance Zr of the stub line 62a, 64a is equal to 50 Ω, the characteristic impedance Zsr of the sub line 66a is apparently coincident with the composite impedance (Zr/2+Rr) of the composite impedance Zr/2 of the two branched stub lines 62a and 64a and the matching resistor 68a when viewed from the sub line 66a side.

Therefore, according to this embodiment, impedance matching can be performed at the connection point between the stub line 62a, 64a and the sub line 66a, thereby preventing the electrical signal output from the output buffer 44a of the synchronous RAM 4a from producing an undesired reflection wave at the connection point E.

Further, the amount of the current flowing from the output buffer 44a of the synchronous RAM 4a through the sub line 66a into the stub lines 62a, 64a can be reduced by the matching resistor 68a, whereby sharply varying of the large amount of current can be prevented, and undesired electromagnetic interference (EMI), etc. can be reduced.

Next, the electrical characteristic at the dividing point E will be described.

In the read data bus 6a of this embodiment, a wiring pattern having a characteristic impedance Zu of 50 Ω is used for the main line 61a, and a wiring pattern having a characteristic impedance Zr of 50 Ω is used for the stub lines 62a, 64a. Further, a matching resistor having a resistance value Rmr of 25 Ω is inserted between the main line 61a and the dividing point E.

Accordingly, the characteristic impedance Zu of the main line 61a is coincident with the composite impedance (Zr/2+Rmr) of the composite characteristic impedance Zr/2 of the stub lines 62a and 64a and the matching resistor 67a, so that impedance matching can be performed at the dividing point E.

When arriving at the input buffer 14a of the memory controller 1a, the electrical signal output from the output buffer 44a of the synchronous RAM 4a produces a reflection wave due to the difference in characteristic impedance at the contact point between the input buffer 14a and the main line 61a, and the reflection wave thus produced arrives at the dividing point E. However, in this embodiment, since impedance matching is performed at the dividing point E, the reflection wave can be prevented from further producing a reflection wave at the dividing point E. Accordingly, the reflection wave can be prevented from being repetitively and alternately produced at the connection point between the input buffer 14a and the main line 61a and at the dividing point E, and thus the amplitude of the electrical signal input to the input buffer 14a is stepwise increased. Accordingly, the potential establishing time of the electrical signal to be input to the input buffer 14a can be shortened, so that the memory access latency can be shortened.

Further, the amount of the current flowing into the main line 61a can be reduced by the matching resistor 67a, whereby sharp variation of the large amount of current can be suppressed and undesired electromagnetic interference (EMI), etc. can be reduced. Further, the matching resistor 67a constitutes an RC circuit in combination with the parasitic capacitance of the wiring pattern used as the main line 61a and the parasitic capacitance of the input buffer 14a of the memory controller 1a. The time constant of the RC circuit is ordinarily shorter than the bus cycle of the signal propagating onto the read data bus 6a and longer than the period of rising or falling of the signal, so that an electrical signal having a smooth waveform which reflects the waveform of the electrical signal output from the output buffer 44a of the synchronous RAM 4a can be input to the input buffer 14a.

In place of insertion of the matching resistor at the dividing point, the characteristic impedance Zu of the main line 61a and the composite characteristic impedance Zr/2 of the stub lines 62a and 64a may be made coincident with each other using a wiring pattern design, whereby impedance matching can be performed at the dividing point E.

Next, the electrical characteristic at the terminals of the stub lines 62a and 64a will be described.

In the read data bus 6a of this embodiment, each of the terminals of the stub lines 62a and 64a is connected to the line Vtt through the terminal resistor 69a having a resistance value of 50 Ω. Accordingly, the characteristic impedance Zr of the stub line 62a, 64a is coincident with the resistance value Rk of the terminal resistor 69a, so that impedance matching can be performed at each of the terminals of the stub lines 62a and 64a, whereby the electrical signal and the reflection wave which arrive at the terminals of the stub lines 62a and 64a can be absorbed by the terminal resistor 69a.

Next, the propagation mode of the electrical signal on each bus when the synchronous memory system of this embodiment is operated, will be described with reference to the drawings.

Figure 9:
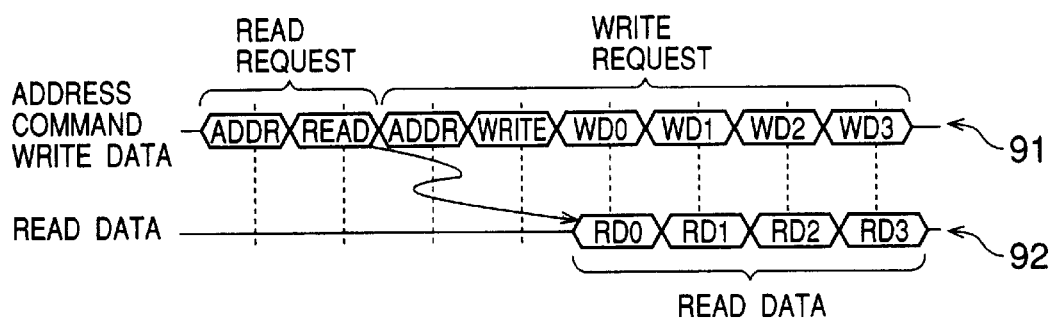
FIG. 9 is a timing chart showing the operation of the first embodiment.

FIG. 9 is a timing chart showing the operation of this embodiment. In FIG. 9, reference numeral 91 represents reception timings of an address, a command and write data which are latched by the input buffer 42a of the synchronous RAM 4a with a synchronizing clock as a trigger. Reference numeral 92 represents an output timing of read data which are output from the output buffer 44a of the synchronous RAM 4a.

In the case of FIG. 9, the input buffer 42a of the synchronous RAM 4a receives a read request comprising an address and a read command, and subsequently receives a write request comprising an address, a write command and write data. On the other hand, the output buffer 44a of the synchronous RAM 4a outputs read data three cycles after the input buffer 42a receives the read command. That is, the synchronous RAM 4a receives the write request before the operation of the read request is completed, whereby the read request and the write request of the synchronous memory system are pipelined. The synchronous RAM 4a temporarily stores the write request subsequently received by a data buffer of the memory portion, and performs a write-in operation immediately after data are allowed to be written into the memory cell.

Figure 10:
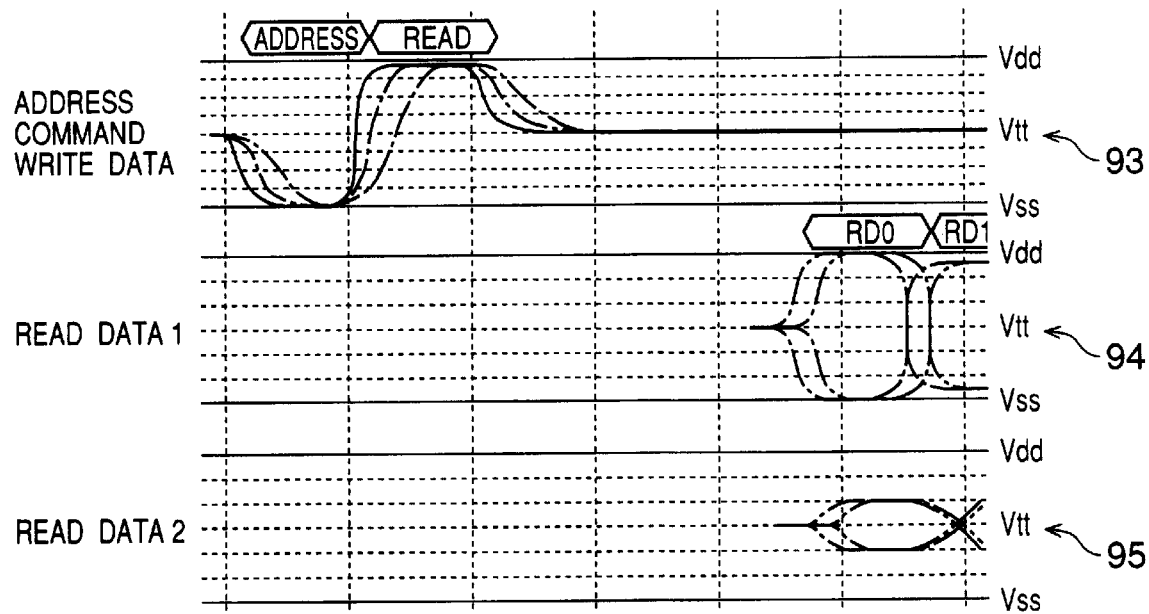
FIG. 10 is a diagram showing the propagation waveform of a read request and read data at each position when the read request shown in FIG. 9 is made.

When the read request shown in FIG. 9 is made in this embodiment, the propagation waveform of the read request and the read data which are read out on the basis of the request becomes as shown in FIG. 10.

FIG. 10 is a diagram showing the propagation waveform of the read request and the read data at each position when the read request shown in FIG. 9 is made. In FIG. 10, reference numeral 93 represents the propagation waveform of the read request. A solid line indicates the propagation waveform at the input buffer 12a of the memory controller 1a, a single dot & dash line indicates the propagation waveform at the input buffer 42a of the synchronous RAM $4a_{\#1}$ or $4a_{\#2}$, and a double dot & dash line indicates the propagation waveform at the input buffer 42a of the synchronous RAM $4a_{\#n-1}$ or $4a_{\#n}$. Reference numeral 94 represents the propagation waveform of the read data, a single dot & dash line represents the propagation waveform at the output buffer of the read data which are output from the output buffer 44a of the synchronous RAM $4a_{\#1}$ or $4a_{\#2}$, and a double dot & dash line represents the propagation waveform at the output buffer 44a of the read data which are output from the output buffer 44a of the synchronous RAM $4a_{\#n-1}$ or $4a_{\#n}$, Reference numeral 95 represents the propagation waveform of the read data input to the input buffer 14a of the memory controller 1a. A single dot & dash line represents the propagation waveform of the read data output from the synchronous RAM $4a_{\#1}$ or $4a_{\#2}$, and a double dot & dash line represents the propagation waveform of the read data output from the synchronous RAM $4a_{\#n-1}$ or $4a_{\#n}$. In FIG. 10, the axis of abscissa represents time.

The amplitude of the read request which is output from the output buffer 12a of the memory controller 1a is determined by the divisional resistance ratio of the internal impedance of the output buffer 12a and the terminal resistor 59a. Accordingly, the amplitude of the read request is substantially constant at any position on the address command clock write data bus 5a. The impedance of the wiring pattern which forms the address command clock write data bus 5a is mainly dependent on the parasitic capacitance, and thus it has little effect on the amplitude. The read request which arrives at the input buffer 42a of the synchronous RAM 4a shows smooth rising and falling in accordance with the time constant of the RC circuit comprising the parasitic capacitance of the input buffer 42a and the sub line 56a and the matching resistor 58a as shown by reference numeral 93 of FIG. 10. The read request which arrives at the input buffer 42a of the synchronous RAM $4a_{\#n-1}$ or $4a_{\#n}$ arrives at the input buffer 42a with a slight delay from the arrival of the read request at the synchronous RAM $4a_{\#1}$ or $4a_{\#2}$ due to the propagation delay on the address command clock write data bus 5a as shown by reference numeral 93 of FIG. 10.

The synchronous RAM 4a outputs the read data from the output buffer 44a in the reception order of the read request output from the memory controller 1a. Accordingly, as shown by reference numeral 94 of FIG. 10, the read data output from the output buffer 44a of the synchronous RAM $4a_{\#n-1}$ or $4a_{\#n}$ are output with a slight delay from the output of the read data from the output buffer 44a of the synchronous RAM $4a_{\#1}$ or $4a_{\#2}$.

The amplitude of the read data input to the input buffer 14a of the memory controller 1a is compressed in accordance with the divisional resistance ratio of the sum of the internal impedance of the output buffer 44a of the synchronous RAM 4a and the matching resistor 68a, and the terminal resistor 69a as shown by reference numeral 95 of FIG. 10. Further, in the read data bus 6a, the positional relationship of the synchronous RAM 4a to the memory controller 1a is reversed to the case of the address command clock write data bus 5a. Therefore, the read data from the respective synchronous RAMs 4a which arrive at the input buffer 14a of the memory controller 1a arrive substantially at the same time as shown by reference numeral 95 of FIG. 10. The read data arriving at the input buffer 14a of the memory controller 1a smoothly rises and falls in accordance with the time constant of the RC circuit comprising the parasitic capacitance of the input buffer 14a and the main line 61a and the matching resistor 67a.

In this embodiment, as shown in FIG. 10, the amplitude of the signal propagating on the address command clock write data bus 5a is determined in accordance with the divisional resistance ratio of the sum of the internal impedance of the input buffer 42a of the synchronous RAM 4a and the resistance of the matching resistor 58a, and the terminal resistor 59a. On the other hand, the amplitude of the signal propagating on the read data bus 6a is determined in accordance with the divisional resistance ratio of the sum of the internal impedance of the output buffer 44a of the synchronous RAM 4a and the resistance of the matching resistor 68a, and the terminal resistor 69a. Accordingly, the values of the matching resistors 58a and 68a and the values of the terminal resistors 59a and 69a are set so that the divisional resistance ratios as described above are set to suitable values, whereby various signal amplitudes which are matched with the respective standards of different bus interfaces can be obtained between the address command clock write data bus 5a and the read data 6a.

However, the values of the matching resistors 58a and 68a and the values of the terminal resistors 59a and 69a are determined by the characteristic impedance of the wiring patterns constituting the address command clock write data bus 5a and the read data bus 6a. Accordingly, in order to set the values of the matching resistors 58a and 68a and the values of the terminal resistors 59a and 69a so that the divisional resistance ratios as described above are set to suitable values, the characteristic impedance of the wiring pattern must be set to a suitable value. In this case, it is better to vary the characteristic impedance of the wiring patterns constituting the sub lines 56a and 66a in order to set the values of the matching resistors 58a and 68a to suitable values.

Next, the printed circuit board on which the synchronous memory system of this embodiment is mounted will be described.

Figure 11:
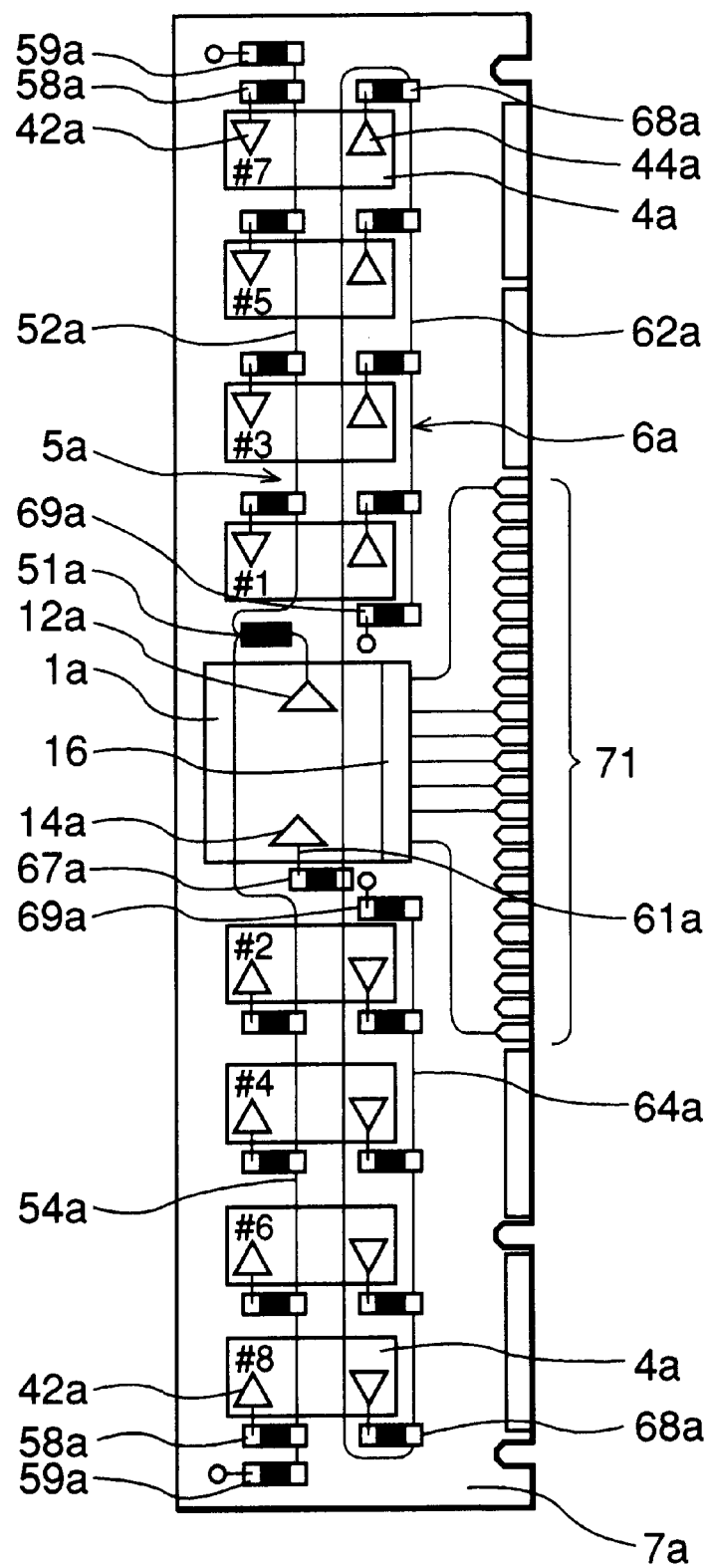
FIG. 11 is a diagram showing a memory riser card in which the synchronous memory system of the first embodiment is installed.
Figure 12:
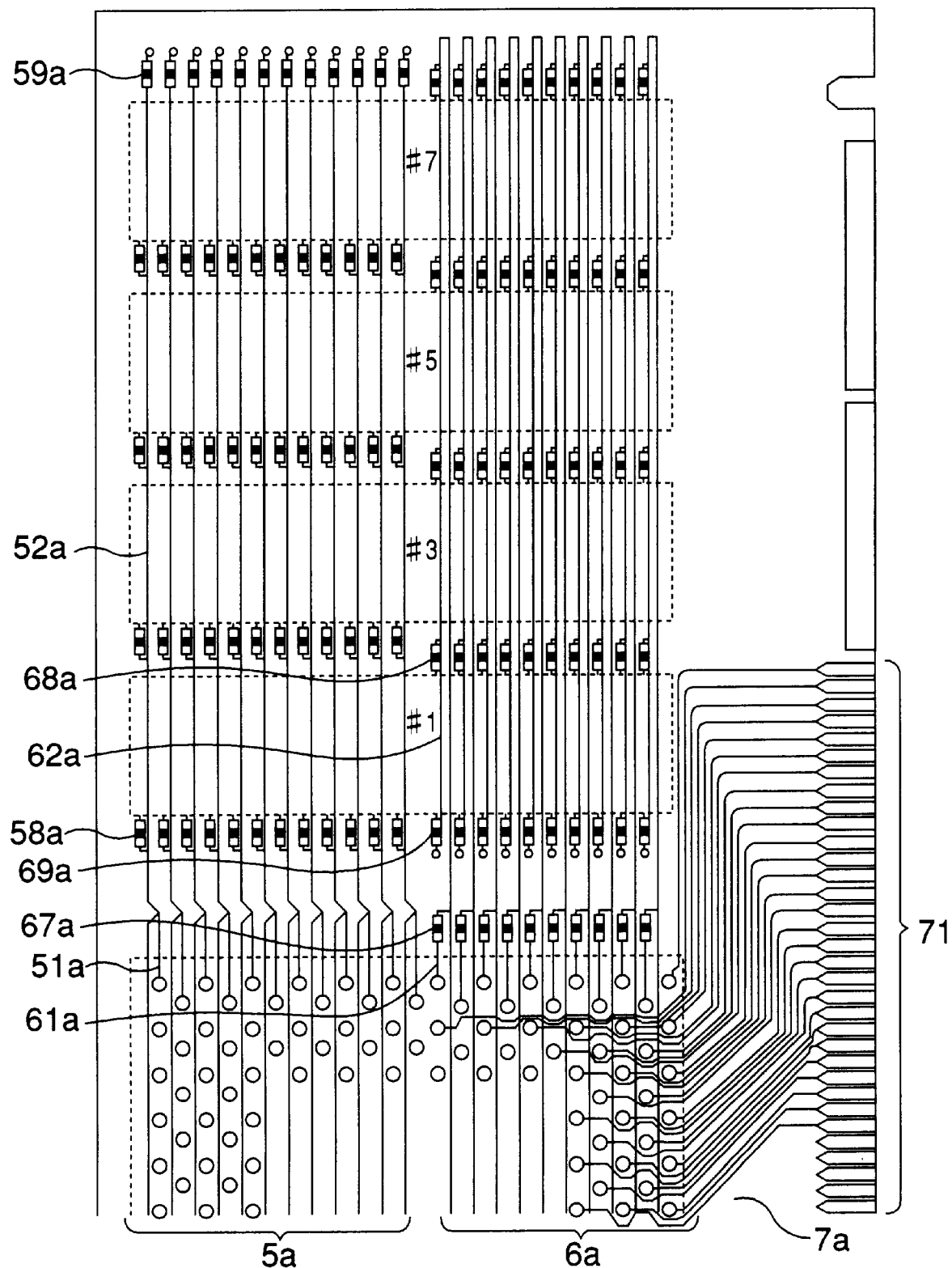
FIG. 12 is a partially enlarged view of the memory riser card shown in FIG. 11.

FIG. 11 is a diagram showing the construction of a memory riser (expansion) card in which the synchronous memory system of this embodiment is mounted, and FIG. 12 is a partially enlarged view of the memory riser card shown in FIG. 11.

In the memory riser card 7a shown in FIG. 11, the memory controller 1a is disposed at the center of the memory riser card 7a. Further, the odd-numbered synchronous RAMs $4a_{\#1}$ to $4a_{\#7}$ and the even-numbered synchronous RAMs $4a_{\#2}$ to $4a_{\#8}$ are arranged so as to be symmetrical at the upper and lower sides with respect to the memory controller 1, and spaced uniformly (at equal intervals). Further, the synchronous RAMs 4a are arranged in ascending order (the order of #1, #3, . . . , #7 for the odd-numbered synchronous RAMs 4a, and the order of #2, #4, . . . , #8 for the even-numbered synchronous RAMs 4a) from the memory controller 1a toward the end portion in the longitudinal direction of the memory riser card 7a.

A conductive contact pad 71 is formed in the memory riser card 7a for electrically connecting the synchronous memory system of this embodiment to an information processing device. The conductive contact pad 71 is electrically connected to the information processing device by engaging the memory riser card 7a with a connector of the information processing device. Further, the conductive contact pad 71 is connected through a wiring pattern to an interface 16 of the memory controller 1a to the information processing device.

A wiring pattern constituting the address command clock write data bus 5a, and a wiring pattern constituting the read data bus 6a are formed in the memory riser card 7a.

The wiring pattern constituting the main line 51a of the address command clock write data bus 5a is connected at one end thereof to the output buffer 12a of the memory controller 1a, and is also connected at the other end thereof to the stub lines 52a and 54a of the address command clock write data bus 5a in the vicinity of the memory controller 1a. The stub lines 52a and 54a are extended from the vicinity of the memory controller 1a connected to the main line 51a toward the end portion in the longitudinal direction of the memory riser card 7a. Each input buffer 42a of the odd-numbered synchronous RAMs $4a_{\#1}$ to $4a_{\#7}$ is connected through each matching resistor 58a to the wiring pattern constituting the stub line 52a, and each input buffer 42a of the even-numbered synchronous RAMs $4a_{\#2\ to\ 4a_{\#8}}$ is connected through each matching resistor 58a to the wiring pattern constituting the stub line 54a, whereby the connection order of the synchronous RAMs 4a (through the stub lines 52a and 54a) to the memory controller 1a is set to the ascending order (i.e., the order of #1, #3, . . . , #7 for the stub line 52a, and the order of #2, #4, . . . , #7 for the stub line 54a) as shown in FIG. 11. The terminals of the stub lines 52a and 54a are respectively connected to the terminal resistors 59a at the end portion in the longitudinal direction of the memory riser card 7a.

The wiring pattern constituting the main line 61a of the read data bus 6a is connected to the input buffer 14a of the memory controller 1a at one end thereof, and is also connected at the other end to the stub lines 62a and 64a of the read data bus 6a through the matching resistor 67a in the vicinity of the memory controller 1a. The stub lines 62a and 64a are extended from the vicinity of the memory controller 1a connected to the main line 61a toward the end portion in the longitudinal direction of the memory riser card 7a, and at the end portion thereof they are turned up and extended toward the memory controller 1a again. Each of the output buffers 44a of the odd-numbered synchronous RAMs $4a_{\#1}$ to $4a_{\#7}$ is connected through each matching resistor 68a to a portion extending from the terminal of the wiring pattern constituting the stub line 62a to the end portion in the longitudinal direction of the memory riser card 7a. Further, each of the output buffers 44a of the even-numbered synchronous RAMs $4a_{\#2}$ to $4a_{\#8}$ is connected through each matching resistor 68a to a portion extending from the terminal of the wiring pattern constituting the stub line 64a to the end portion in the longitudinal direction of the memory riser card 7a. With this connection arrangement the connection order of the synchronous RAMs 4a (connected through the stub lines 62a and 64a) to the memory controller 1a is set to the descending order (the order of #7, #5, . . . , #1 for the stub line 62a, and the order of #8, #6, . . . , #2 for the stub line 64a) as shown in FIG. 11. The terminal resistor 69a is connected to each of the terminals of the stub lines 62a and 64a in the vicinity of the memory controller 1a.

Next, the memory riser card 7a will be described in detail.

The memory riser card 7a has a multi-layer substrate comprising a power source layer and a ground layer which are formed inside of the memory riser card 7a, and two signal layers which are formed on the above layers. The characteristic impedance of one signal layer (hereinafter referred to as "inner layer") which is nearer to the power source layer or the ground layer is set to about 40 to 50 Ω, and that of the other signal layer (hereinafter referred to as "outer layer") is set to about 80 to 100 Ω. Since the memory riser card has the two signal layers having different characteristic impedance values as described above, an equal bus-length wiring can be formed between the memory controller 1a and each synchronous RAM 4a by using the two signal layers selectively.

In the case of FIG. 11, an inner layer wiring pattern having a characteristic impedance of 40 Ω is used for the main line 51a, and an outer layer wiring pattern having a characteristic impedance of 80 Ω is used for the stub lines 52a and 54a to form the address command clock write data bus 5a. Further, an inner layer wiring pattern having a characteristic impedance of 50 Ω is used for the main line 61a and the stub lines 62a and 64a to form the read data bus 6a.

In FIG. 11, each of the address command clock write data bus 5a and the read data bus 6a is illustrated as one line. However it is, actually constructed by plural signal lines as shown in FIG. 12. The matching resistors 58a, 67a and 68a and the terminal resistors 59a and 69a are allocated to each signal line. In the memory riser card 7a, in order to prevent interference of the read data bus 6a with connection lines of the conductive contact pad 71 and the memory controller 1a, the outer layer wiring pattern is used for the connection lines as shown in FIG. 12.

Figure 13:
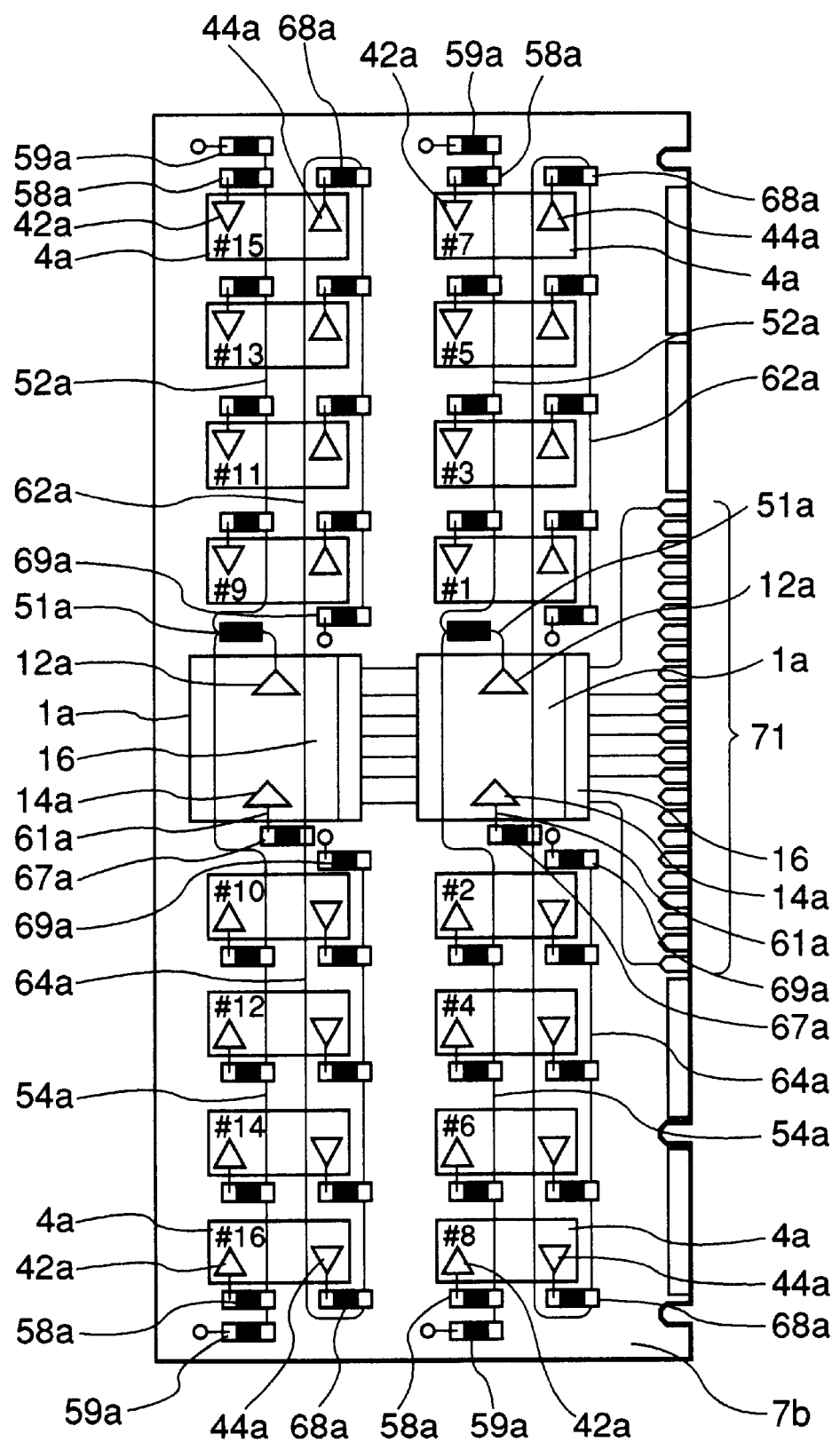
FIG. 13 is a diagram showing the memory riser card in which two systems of synchronous memory systems of the first embodiment are installed.

A memory riser board 7b in which two systems of synchronous memory systems of this embodiment are mounted as shown in FIG. 13 may be considered as the memory riser card in which the synchronous memory system of this embodiment is mounted. Further, in addition to the memory riser card, a memory module in which a memory controller is mounted, or the like, may be considered as the printed circuit board in which the synchronous memory system of this embodiment is mounted.

Next, a second embodiment of the present invention will be described with reference to the accompanying drawings.

Figure 14:
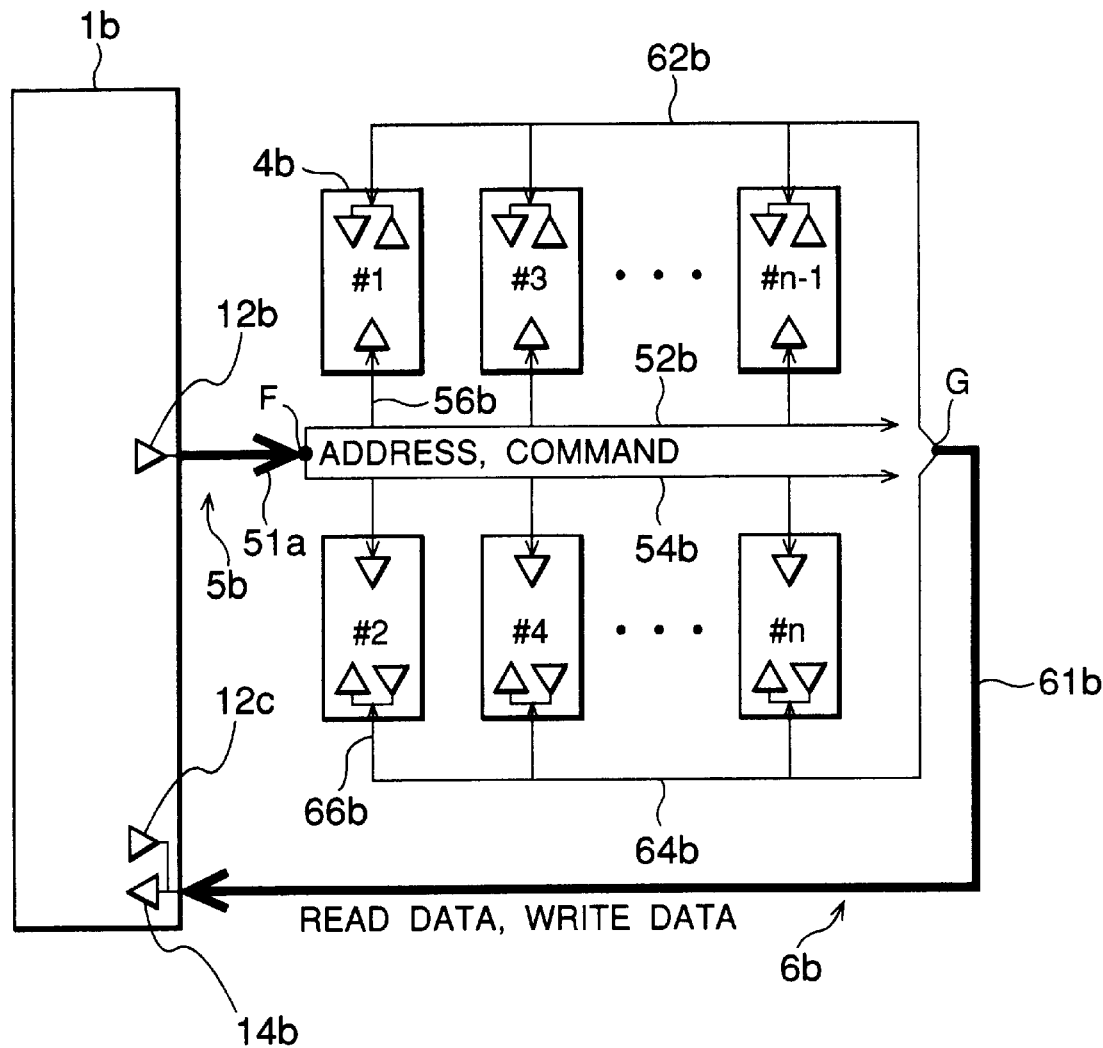
FIG. 14 is a diagram showing a synchronous memory system according to a second embodiment of the present invention.
Figure 15:
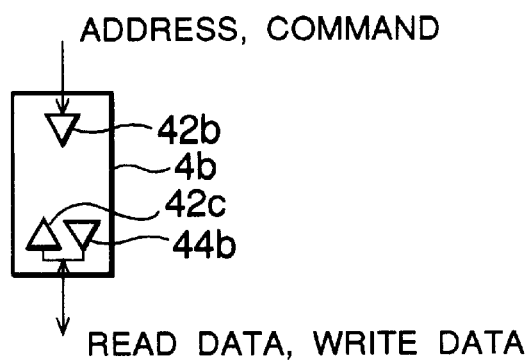
FIG. 15 is a block diagram showing a synchronous DRAM shown in FIG. 14.

FIG. 14 is a diagram showing the construction of a synchronous memory system according to a second embodiment of the present invention, and FIG. 15 is a block diagram showing a synchronous DRAM shown in FIG. 14.

As shown in FIG. 14, the synchronous memory system of this embodiment includes synchronous DRAMs $4b_{\#1}$ to $4b_{\#n}$ (hereinafter, in some cases, merely referred to as "synchronous RAM 4b") whose number is even, a memory controller 1b for controlling the write-in and read-out operation of data into/from the synchronous DRAMs 4b, an address command clock bus 5b and a read data/write data bus 6b.

The memory controller 1b outputs from an output buffer 12b thereof addresses, commands and synchronizing clocks for controlling the write-in and read-out operations of the synchronous DRAMs 4b, and also outputs from an output buffer 12c thereof write data to be written into the synchronous DRAMs 4b and synchronizing clocks. Further, it receives through an input buffer 14b thereof read data which are output from the synchronous DRAMs 4b.

As shown in FIG. 15, the synchronous DRAM 4b includes the input buffer 42b for receiving an address, a command and a synchronizing clock, an input buffer 42c for receiving write data and the synchronizing clock, an output buffer 44b for outputting read data, and a memory portion including a memory cell, a sense amplifier, a sequencer, etc. (not shown). The synchronous DRAM 4b latches the address and the read command in response to the synchronizing clock on the address command clock bus 5b as a trigger, and reads out the read data of the address concerned and outputs the data from the output buffer 44b in accordance with the latched address and read command.

Further, the synchronous DRAM 4b latches the address and the write command with the synchronizing clock on the address command clock bus 5b as a trigger. In accordance with the latched address and write command, the synchronous DRAM 4b writes the latched write data into the address in response to the synchronizing clock on the read data/write data bus 6b as a trigger. This synchronous DRAM 4b is the same as the synchronous DRAM which has been conventionally used.

The address command clock bus 5b is used to input the address and the command output from the output buffer 12b of the memory controller 1b into the input buffer 42b of each of the synchronous DRAMs 4b. Further, a main line 51b of the address command clock bus 5b is branched into two stub lines 52b and 54b at a dividing point F as shown in FIG. 14. Odd-numbered synchronous DRAMs $4b_{\#1}$ (i=1, 3, ..., n-1) are connected to the stub line 52b through respective sub lines 56b at equal intervals, and even-numbered synchronous DRAMs $4b_{\#j}$ (j=2, 4, ..., n) are connected to the stub line 54b through respective sub lines 56b at equal intervals. With this connection arrangement, the length of the stub lines 52b and 54b are set to be substantially equal to each other.

The read data/write data bus 6b is used to input the address and the command output from the output buffer 12c of the memory controller 1a into the input buffer 42c of the synchronous DRAM 4b, and input the read data output from the output buffer 44b of the synchronous DRAM 4b into the input buffer 14b of the memory controller 1b. As in the case of the address command clock bus 5b, a main line 61b of the read data/write data 6b is branched into two stub lines 62b and 64b at a dividing point G, and odd-numbered synchronous DRAMs $4b_{\#1}$ (i=1,3, ..., n-1) are connected through sub lines 66b to the stub line 62b at equal intervals while even-numbered synchronous DRAMs $4b_{\#j}$ (j=2, 4, ..., n) are connected through sub lines 66b to the stub line 64b at equal intervals. With this connection arrangement, the length of the stub line 62b and the length of the stub line 64b are set to be substantially equal to each other.

The stub lines 52b and 54b of the address command clock bus 5b set the connection order of the synchronous DRAMs 4b to the memory controller 1b to the ascending order (the order of #1, #3, ..., #n-1 for the stub line 52b, and the order of #2, #4, ..., #n for the branch 54b). On the other hand, the stub lines 62b and 64b of the read data/write data bus 6b set the connection order of the synchronous DRAMs 4b to the memory controller 1b to the descending order (the order of #n-1, #n-3, ..., #1 for the stub line 62b, and the order of #n, #n-2, ..., #2 for the branch 64b). As described above, the length of the stub line 52b and the length of the stub line 54b of the address command clock bus 5b are set to be substantially equal to each other, and the length of the stub line 62b and the length of the stub line 64b of the read data/write data bus 6b are set to be substantially equal to each other. Therefore, each sum of the bus length of the address command clock bus 5b between the memory controller 1b and each synchronous DRAM 4b and the bus length of the read data/write data bus 6b between the memory controller 1b and the synchronous DRAM 4b is set to be substantially equal among all the synchronous DRAMs $4b_{\#1}$ to $4b_{\#n}$.

According to the synchronous memory system of this embodiment, the synchronous DRAM 4b latches the address and the write command output from the memory controller 1b onto the address command clock bus 5b, and latches the write data output from the memory controller 1a onto the read data/write data bus 6b with the synchronizing clock output from the memory controller 1b onto the read data/write data bus 6b as a trigger, whereby the synchronous transmission of the write data can be implemented.

Further, each sum of the bus length of the address command clock bus 5b between the memory controller 1b and the synchronous DRAM 4b and the bus length of the read data/write data bus 6a between the memory controller 1b and the synchronous DRAM 4b is set to be substantially equal among all the synchronous DRAMs $4b_{\#1}$ to $4b_{\#n}$. Therefore, the memory access latency from the time when the output buffer 12b of the memory controller 1b outputs an address and a command indicating "read" until the time when the input buffer 14b of the memory controller 1b receives the data of the address concerned can be kept substantially constant with respect to all the synchronous RAMs $4b_{\#1}$ to $4b_{\#n}$.

Further, as shown in FIG. 14, each of the address command clock bus 5b and the read data write data bus 6b is branched into two branches, and one stub line is connected to the odd-numbered synchronous DRAMs 4b while the other stub line is connected to the even-numbered synchronous DRAMs 4b, whereby the maximum bus length of the address command clock bus 5b, the read data/write data bus 6b between the memory controller 1b and the synchronous DRAMs 4b can be set to be substantially a half of that in the case of the conventional synchronous memory system shown in FIG. 32. Accordingly, the memory access latency of the memory controller 1b to each synchronous DRAM 4b can be shortened. Further, unlike the conventional synchronous memory system shown in FIG. 33, it is not necessary to provide the two output buffers corresponding to the two address command buses, and the two input buffers and output buffers corresponding to the two read data/write data buses in the memory controller. Accordingly, the memory controller can be prevented from being increased in size. In addition, an increase in the number of pins of the memory controller can be prevented.

Furthermore, according to this embodiment, since the synchronous DRAM which has been hitherto used is used as a synchronous memory, component sharing and cost-down can be performed.

Next, the construction of the address command clock bus 5b and the read data/write data bus 6b of this embodiment will be described with reference to the drawings.

Figure 16:
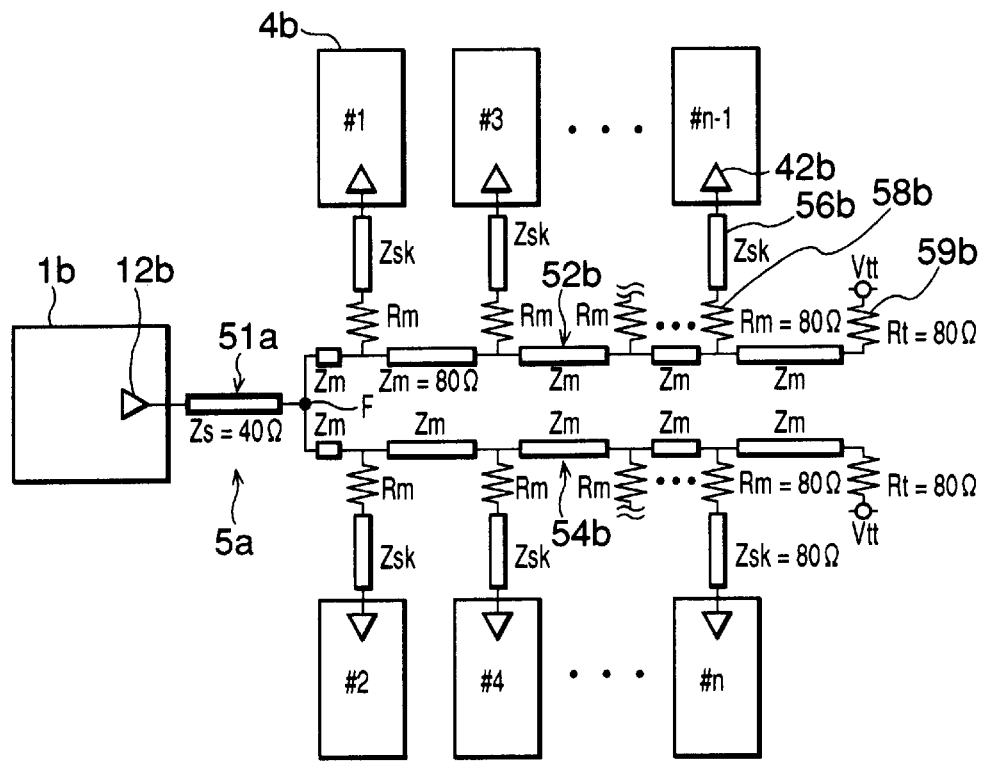
FIG. 16 is a diagram showing an address command clock bus shown in FIG. 14.
Figure 17:
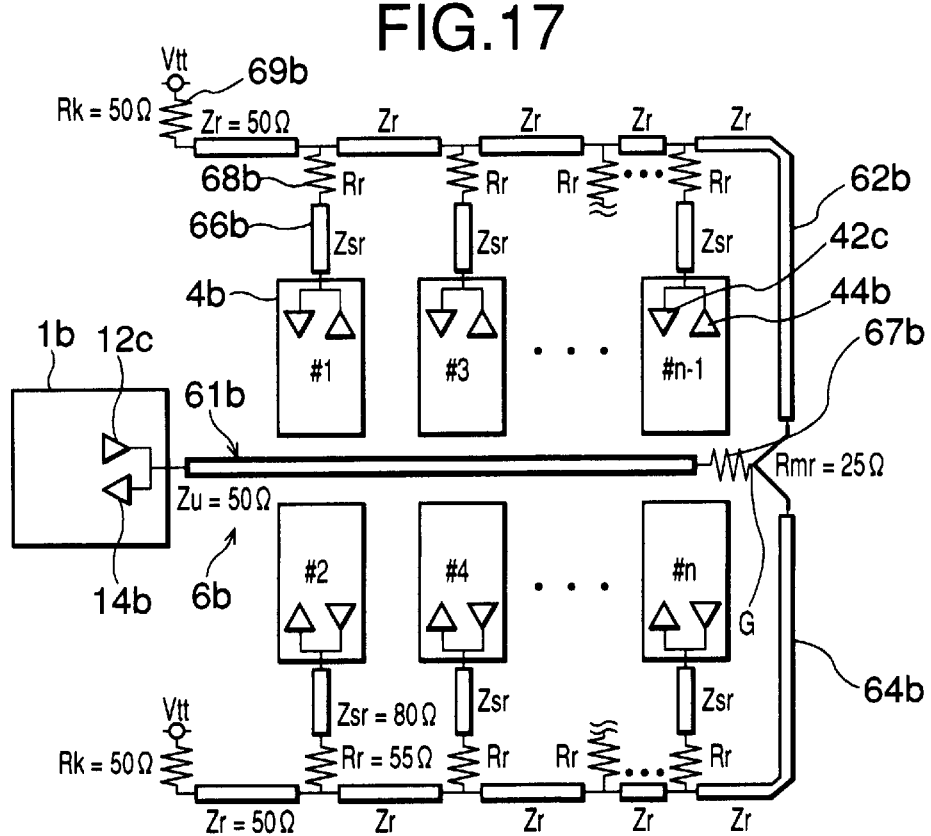
FIG. 17 is a diagram showing a read data/write data bus shown in FIG. 14.

FIG. 16 is a diagram showing the construction of the address command bus shown in FIG. 14, and FIG. 17 is a diagram showing the construction of the read data/write data bus shown in FIG. 14.

The construction of the address command clock bus 5b of this embodiment shown in FIG. 16 is basically identical to that of the address command clock write data bus 5a of the first embodiment of FIG. 3. That is, a wiring pattern having a characteristic impedance Zs of 40 Ω is used for the main line 51b, and a wiring pattern having a characteristic impedance Zm of 80 Ω is used for the stub lines 52b and 54b. The terminal of each of the stub lines 52b and 54b is connected to the line Vtt through a terminal resistor 59b having a resistance value Rt of 80 Ω. Further, a wiring pattern having a characteristic impedance Zsk of 80 Ω is used for the sub line 56b, and each sub line 56b is connected to the corresponding stub line 52b, 54b through each matching resistor 58b having a resistance value of 40 Ω.

With this construction, the same effect as the address command clock write data bus 5a according to the first embodiment can be obtained. For example, impedance matching at the dividing point F can be performed, and the electrical signal output from the output buffer 12b of the memory controller 1b can be prevented from producing an undesired reflection wave at the dividing point D.

Further, impedance matching can be performed at the connection point between the stub line 52b, 54b and the sub line 56b. Accordingly, the reflection wave can be prevented from being alternately and repetitively produced at the connection point between the sub line 56b and the synchronous DRAM 4b and at the connection point between the sub line 56b and the stub line 52b,54b connected to the sub line 56b, resulting in prevention of malfunction of the synchronous DRAM 4b due to the stepwise increase of the amplitude of the electrical signal input to the input buffer 44b.

Still further, impedance matching can be performed at each of the terminals of the stub lines 52b and 54b, whereby the electrical signal and the reflection wave which arrive at each of the terminals of the stub lines 52b and 54b can be absorbed by the terminal resistor 59b.

The construction of the read data/write data bus 6b of the present embodiment shown in FIG. 17 is basically identical to that of the read data bus 6a of the first embodiment shown in FIG. 6. That is, a wiring pattern having a characteristic impedance Zu of 50 Ω is used for the main line 61b, and a wiring pattern having a characteristic impedance Zr of 50 Ω is used for the stub lines 62b and 64b. In addition, a matching resistor 67b having a resistance value Rmr of 25 Ω is inserted between the main line 61b and the dividing point G. Each of the terminals of the stub lines 62b and 64b is connected to the line Vtt through the terminal resistor 69b having a resistance value Rk of 50 Ω. Further, a wiring pattern having a characteristic impedance Zsr of 80 Ω is used for the main line 66b, and each sub line 66b is connected to the corresponding stub line 62b, 64b through each matching resistor 68b having a resistance value Rr of 55 Ω.

With this construction, the same effect as the read data bus 6a according to the first embodiment can be obtained. For example, impedance matching at the connection point between the stub line 62b, 64b and the sub line 66b can be performed, whereby the electrical signal output from the output buffer 44b of the synchronous DRAM 4b can be prevented from producing an undesired reflection wave at the connection point.

Further, impedance matching can be performed at the dividing point G, whereby the reflection wave can be prevented from being alternately and repetitively produced at the connection point between the input buffer 14b and the main line 61b and at the dividing point G, resulting in prevention of the malfunction of the memory controller 1b due to the stepwise increase of the amplitude of the electrical signal input to the input buffer 14b.

Still further, impedance matching can be performed at each of the terminals of the stub lines 62b and 64b. Therefore, the electrical signal and reflection wave which arrive at the terminals of the stub lines 62b and 64b can be absorbed by the terminal resistor 69b.

Next, the propagation mode of the electrical signal on each bus when the synchronous memory system of this embodiment is utilized will be described with reference to the drawings.

Figure 18:
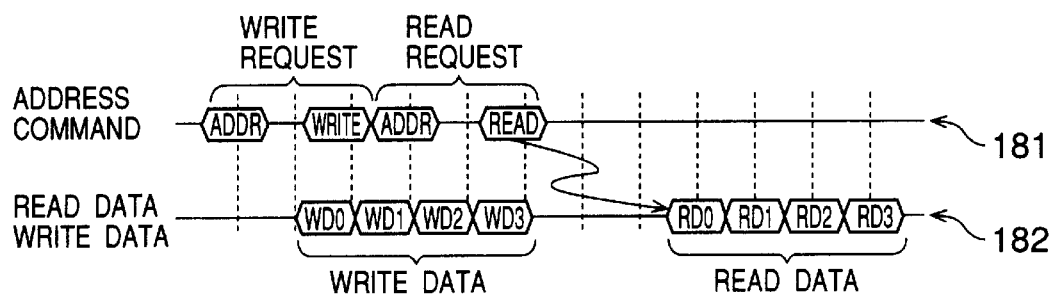
FIG. 18 is a timing chart showing the operation of the second embodiment.

FIG. 18 is a timing chart showing the operation of this embodiment. In FIG. 18, reference numeral 181 represents reception timings of an address and a command which are latched by the input buffer 42b of the synchronous DRAM 4b, and reference numeral 182 represents a reception timing of write data which are latched by the input buffer 42c of the synchronous DRAM 4b and an output timing of read data which are output from the output buffer 44b of the synchronous DRAM 4b.

In the case of FIG. 18, after receiving a write request comprising an address and a write command, the input buffer 42b of the synchronous DRAM 4b subsequently receives a read request comprising an address and a read command. On the other hand, the input buffer 42c of the synchronous DRAM 4b starts to receive the write data substantially simultaneously with the reception of the write command at the input buffer 42b. That is, the synchronous DRAM 4b receives the read request before the operation of the write request is completed. After the input buffer 42b receives the read command, the output buffer 44b of the synchronous DRAM 4b outputs the read data after three cycles. The synchronous DRAM 4b temporarily stores the subsequently received read request into the data buffer of the memory portion, and the read-out operation is started just when the read-out from the memory cell is allowed.

Figure 19:
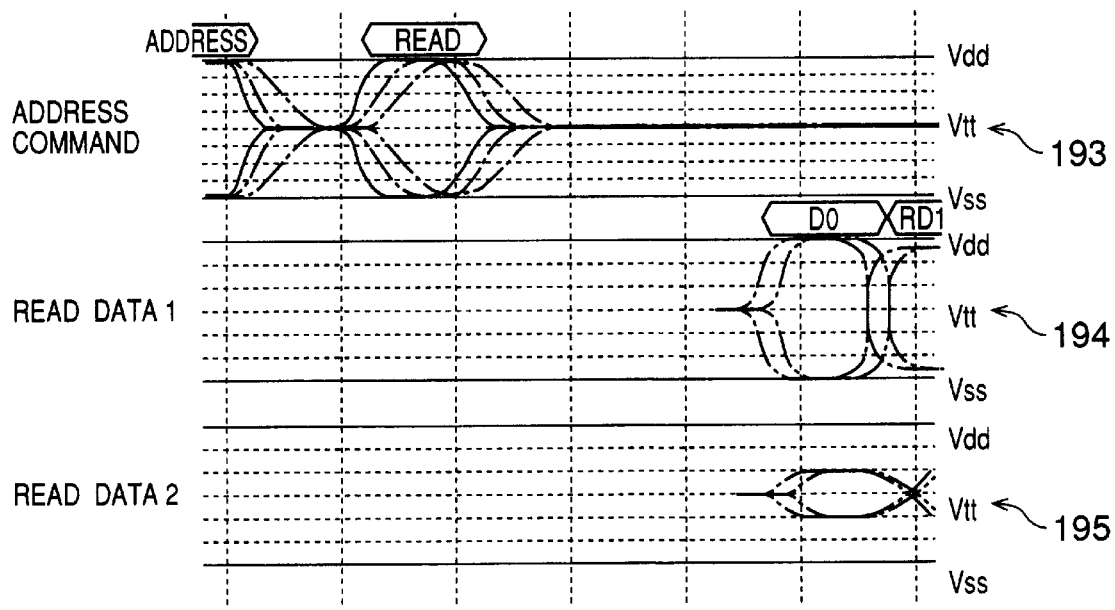
FIG. 19 is a diagram showing the propagation waveform of a read request and read data at each position when the read request shown in FIG. 18 is made.

The propagation waveform of the read request and the read data read out by the read request when the read request shown in FIG. 18 is made is shown in FIG. 19.

FIG. 19 shows the propagation waveform of the read request and the read data at each position when the read request shown in FIG. 18 is made. In FIG. 19, reference numeral 193 represents the propagation waveform of the read request. A solid line represents the propagation waveform of the output buffer 12b of the memory controller 1b, a single dot & dash line represents the propagation waveform at the input buffer 42b of the synchronous DRAM $4b_{\#1}$ or $4b_{\#2}$, and a double dot & dash line represents the propagation waveform at the input buffer 42b of the synchronous DRAM $4b_{\#n-1}$ or $4b_{\#n}$. Reference numeral 194 represents the propagation waveform of the read data, a single dot & dash line represents the propagation waveform at the output buffer 44b of the read data which are output from the output buffer 44b of the synchronous DRAM $4b_{\#1}$ or $4b_{\#2}$, and a double dot & dash line represents the propagation waveform at the output buffer 44b the read data which are output from the output buffer 44b of the synchronous DRAM $4b_{\#n-1}$ or $4b_{\#n}$. Reference numeral 195 represents the propagation waveform of the read data input to the input buffer 14b of the memory controller 1b, a single dot & dash line represents the propagation waveform of the read data output from the synchronous DRAM $4b_{\#1}$ or $4b_{\#2}$, and a double dot & dash line represents the propagation waveform of the read data output from the synchronous DRAM $4b_{\#n-1}$ or $4b_{\#n}$. In FIG. 19, the abscissa represents time.

The amplitude of the read request output from the output buffer 12b of the memory controller 1b is determined by the divisional resistance ratio of the internal impedance of the output buffer 12b and the terminal resistance 59b. Therefore, the amplitude of the read request is kept substantially constant at any position on the address command clock bus 5b. The read request which arrives at the input buffer 42b of the synchronous DRAM 4b shows smooth rise and fall in accordance with the time constant of the RC circuit comprising parasitic capacitance of the input buffer 42b and the sub line 56b, and the matching resistor 58b. The read request which arrives at the input buffers 42b of the synchronous DRAM $4b_{\#n-1}$ or $4b_{\#n}$ arrive with a slight delay from the arrival of the read request at the synchronous DRAM $4b_{\#1}$ or $4b_{\#2}$ because of the propagation delay on the address command clock bus 5b as indicated by reference numeral 193 of FIG. 19.

The synchronous DRAM 4b outputs the read data from the output buffer 44b in the reception order of the read request which is output from the memory controller 1b. Accordingly, as indicated by reference numeral 194 of FIG. 19, the read data output from the output buffer 44b of the synchronous DRAM $4b_{\#n-1}$ or $4b_{\#n}$ are output with a slight delay from the read data output from the output buffer 44b of the synchronous DRAM $4b_{\#1}$ or $4b_{\#2}$.

The amplitude of the read data input to the input buffer 14b of the memory controller 1b is compressed in accordance with the divisional resistance ratio of the sum of the internal impedance of the output buffer 44b of the synchronous DRAM 4b and the resistance of the matching resistor 68b, and the terminal resistor 69 as indicated by reference numeral 195 of FIG. 19. Further, in the read data/write data bus 6b, the positional relationship of the synchronous DRAMs 4b to the memory controller 1b is inverted with respect to the case of the address command clock bus 5b, so that the read data from the respective synchronous DRAMs 4b arrive at the input buffer 14b of the memory controller 1b at substantially the same time as indicated by reference numeral 195 of FIG. 19. Further, the read data arriving at the input buffer 14b of the memory controller 1b shows smooth rise and fall in accordance with the time constant of the RC circuit comprising the parasitic capacitance of the input buffer 14b and the main line 61b, and the matching resistor 67b.

Figure 20:
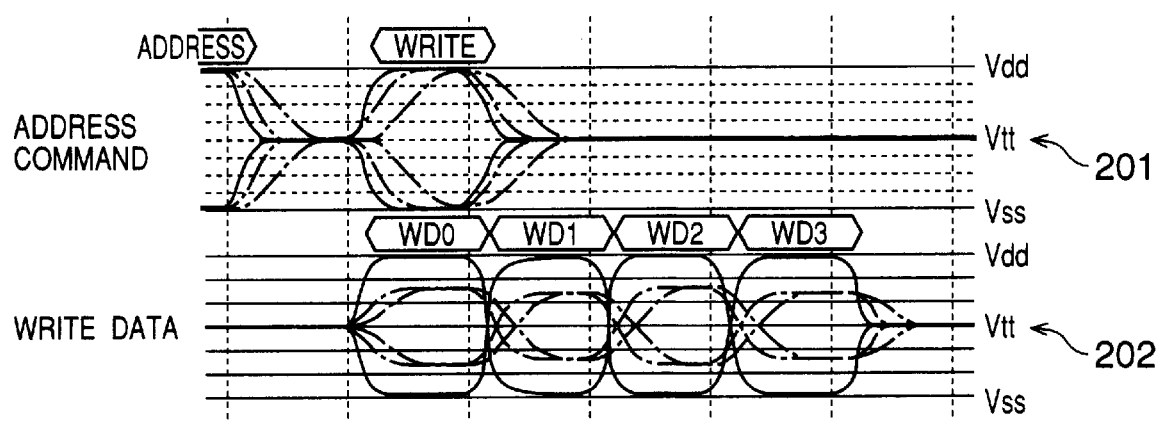
FIG. 20 is a diagram showing the propagation waveform of a write request and write data at each position when the write request shown in FIG. 18 is made.

When the write request shown in FIG. 18 is made, the propagation waveform of the write request and the write data is shown in FIG. 20.

FIG. 20 is a diagram showing the propagation waveform of the write request and the write data at each position when the write request shown in FIG. 18 is made. In FIG. 20, reference numeral 201 represents the propagation waveform of the write request, a solid line represents the propagation waveform at the output buffer 12b of the memory controller 1b , a single dot & dash line represents the propagation waveform at the input buffer 42b of the synchronous DRAM $4b_{\#1}$ or $4b_{\#2}$, and a double dot & dash line represents the propagation waveform at the input buffer 42b of the synchronous DRAM $4b_{\#n-1}$ or $4b_{\#n}$. Reference numeral 202 represents the propagation waveform of the write data, a solid line represents the propagation waveform at the output buffer 12c of the memory controller 1b, a single dot & dash line represents the propagation waveform at the input buffer 42c of the synchronous DRAM $4b_{\#1}$ or $4b_{\#2}$, and a double dot & dash line represents the propagation waveform at the input buffer 42c of the synchronous DRAM $4b_{\#n-1}$ or $4b_{\#n}$. In FIG. 20, the abscissa represents time.

The amplitude of the write request output from the output buffer 12b of the memory controller 1b is determined by the divisional resistance ratio of the internal impedance of the output buffer 12b and the resistance of the terminal resistor 59b. Therefore, the amplitude of the read request is kept substantially constant at any position on the address command clock bus 5b. The write request which arrives at the input buffer 42b of the synchronous DRAM 4b shows smooth rise and fall in accordance with the time constant of the RC circuit comprising the parasitic capacitance of the input buffer 42b and the sub line 56b, and the matching resistor 58b as indicated by reference numeral 201 of FIG. 20. The write request which arrives at the input buffer 42b of the synchronous DRAM $4b_{\#n-1}$ or $4b_{\#n}$ arrives with a slight delay from the arrival of the read request at the synchronous DRAM $4b_{\#1}$ or $4b_{\#2}$ because of the propagation delay on the address command clock bus 5b as indicated by reference numeral 201 of FIG. 20.

The amplitude of the write data which are output from the output buffer 12c of the memory controller 1b and input to the input buffer 42c of the synchronous DRAM 4b is compressed in accordance with the divisional resistance ratio of the sum of the internal impedance of the output buffer 44b of the synchronous DRAM 4b and the resistance of the matching resistor 68b, and the terminal resistor 69b as indicated by reference numeral 202 of FIG. 20. The write data which arrive at the input buffer 42c of the synchronous DRAM 4b show smooth rise-up and falling in accordance with the time constant of the RC circuit comprising the parasitic capacitance of the input buffer 42c and the sub line 66b, and the matching resistor 68b as indicated by reference numeral 202 of FIG. 20. The write data which arrive at the input buffer 42c of the synchronous DRAM $4b_{\#1}$ or $4b_{\#2}$ arrive with a slight delay time from the arrival of the write data at the synchronous DRAM $4b_{\#n-1}$ or $4b_{\#n}$ as indicated by reference numeral 201 of FIG. 20.

In this embodiment, as shown in FIGS. 19 and 20, the amplitude of the signal propagating on the address command clock bus 5b is determined in accordance with the divisional resistance ratio of the internal impedance of the output buffer 12b of the memory controller 1b and the two terminal resistors 59b. On the other hand, the amplitude of the signal propagating on the read data/write data bus 6b is determined in accordance with the divisional resistance ratio of the sum of the internal impedance of the output buffer 44b of the synchronous DRAM 4b and the resistance of the matching resistor 68b, and the two terminal resistors 69b. Accordingly, the values of the matching resistors 58b and 68b and the values of the terminal resistors 59b and 69b are set so that the above divisional resistance ratios are equal to suitable values, whereby the signal amplitude values which are matched to the standards of different bus interfaces can be obtained between the address command clock bus 5b and the read data/write data bus 6b. For example, the address/command signal can be input to the input buffer 42b of the synchronous DRAM 4b with a signal potential which is defined by conventional terminated LV-TTL (Low Voltage-Transistor Transistor Logic). Further, the read data signal can be input to the input buffer 14b of the memory controller 1b with a signal potential which is defined by SSTL (Stub Series Terminated Transceiver Logic) corresponding to the standards for the synchronous DRAMs in EIA/JEDEC of the USA.

However, the values of the matching resistors 58b and 68b and the values of the terminal resistors 59b and 69b are determined by the characteristic impedance of the wiring pattern constituting the address command clock bus 5b and the read data/write data bus 6b. Accordingly, in order to set the values of the matching resistors 58b and 68b and the values of the 59b and 69b so that the divisional resistance ratios as described above are set to appropriate values, the characteristic impedance of the wiring pattern must be set to a suitable value. In this case, it is better that the characteristic impedance of the wiring pattern constituting the sub lines 56b, 66b is varied so that the resistance values of the matching resistors 58b and 68b are equal to suitable values.

The present invention is not limited to the above embodiments, and various modifications may be made within the scope of the subject matter of the present invention. For example, in the above-described embodiments, the matching resistor is inserted between a main line and a dividing point so that the matching is performed at the dividing point when viewed from the main line side of the read data bus or the read data/write data bus. However, the present invention is not limited to this arrangement, and suitable matching resistors may be inserted between a dividing point and a main line and between a dividing point and each stub line, respectively, whereby the matching is performed at the dividing point not only when viewed from the main line side, but also when viewed from the stub line side.

Figure 21:
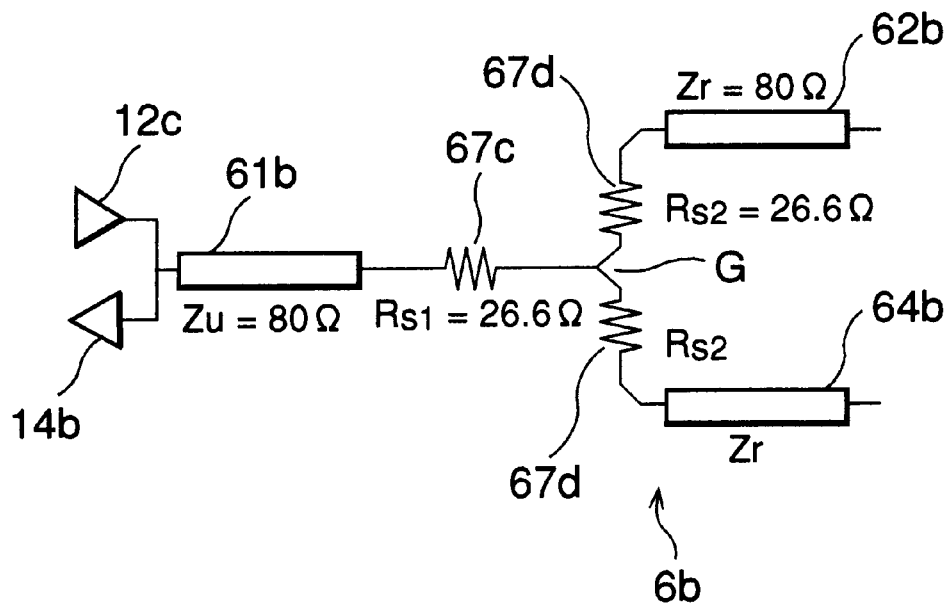
FIG. 21 is a diagram showing a modification of the arrangement of matching resistors at a dividing point.

FIG. 21 shows a modification. In FIG. 21, suitable matching resistors are inserted between the dividing point G and the main line 61b and between the dividing point G and each stub line 62b, 64b respectively in the read data/write data bus 6b of the second embodiment. In the modification shown in FIG. 21, a wiring patter having a characteristic impedance 2 U if 80 Ω is used for the main line 61b and, a wiring pattern having a characteristic impedance Zr of 80 Ω is used for the stub lines 62b and 64b. Further, a matching resistor 67c having a resistance value $R_{s1}$ of 26.6 Ω is inserted between the dividing point G and the main line 61b, and matching resistors 67d each having a resistance value $R_{s2}$ of 26.6 Ω are inserted between the dividing point G and the stub line 62b and between the dividing point G and the stub line 64b respectively.

The above arrangement can set the characteristic impedance (Zu=80 Ω) of the main line 61b and the composite impedance ($R_{s1}$+(Zr+$R_{s2}$)/2=79.9 Ω) of the stub lines 62b and 64b and the matching resistors 67c and 67d to be substantially coincident with each other, so that matching can be performed at the dividing point G when viewed from the main line 61b.

Further, the above arrangement can also set the characteristic impedance (Zr=80 Ω) of the stub line 62b and the composite impedance ($R_{s2}$+(Zu+Zr+$R_{s1}$+$R_{s2}$)/2=79.9 Ω) of the main line 61b, the stub line 64b and the matching resistors 67c and 67d to be substantially coincident with each other, so that the matching at the dividing point G can be performed when viewed from the stub line 62b. The same is satisfied when viewed from the stub line 64b.

As described below, the resistance value $R_{s1}$ of the matching resistor 67c and the resistance value $R_{s2}$ of the matching resistor 67d can be calculated according to the equations (1) and (2), respectively.

$$R_{s1}=Zr2/(4Zu-Zr) \quad (1)$$

$$R_{s2}=Zs(4Zu-3Zr)/(4Zu-Zr) \quad (2)$$

Figure 22:
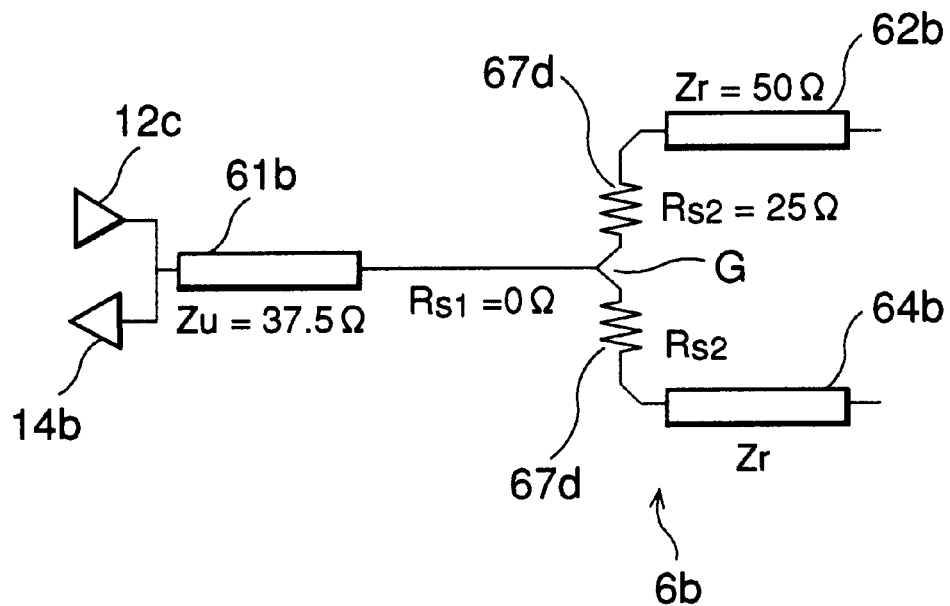
FIG. 22 is a diagram showing another modification of the arrangement of matching resistors at a dividing point.

FIG. 22 shows another modification. In FIG. 22, in the read data/write data bus 6b of the second embodiment, the characteristic impedance Zu of the main line 61b is set to 37.5 Ω, the characteristic impedance Zr of the stub lines 62b, 64b is set to 50 Ω, and the resistance value $R_{s2}$ of the matching resistors 67d which are inserted between the dividing point G and the stub line 62b, and between the dividing point G and the stub line 64b respectively is set to 25 Ω so that the matching is performed under the following condition: the resistance value $R_{s1}$ of the matching resistor 67c=0 Ω. Under the above condition, the matching resistor 67c can be omitted while keeping the matching at the dividing point G.

Further, in each of the above-described embodiments, each of the address command clock write data bus, the read data bus, etc. is branched to two stub lines. However, the present invention is not limited to this arrangement, and each bus may be branched to plural (three or more) branches.

Still further, each of the above-described embodiments adopts a source clock synchronous system in which the address command signal and the write data signal which are propagated on the bus are latched by using as a trigger the synchronizing clock which is propagated on the bus like the address command signal and the write data signal. However, the synchronous memory system of the present invention can also be operated even when in-phase clocks are supplied to the memory controller and all the memories. That is, the memory system of the present invention can also be synchronously operated according to the bus cycle defined by the in-phase clocks, which has been used in the conventional information processing devices.

Each of the above-described embodiments adopts the synchronous memory system in which plural memories are synchronously controlled by the memory controller. However, the present invention may be applied to various fields if it is a bus system in which plural bus slaves are synchronously controlled by a bus master.

Next, a third embodiment of the present invention will be described with reference to FIGS. 23 to 26A and 26B.

Figure 23:
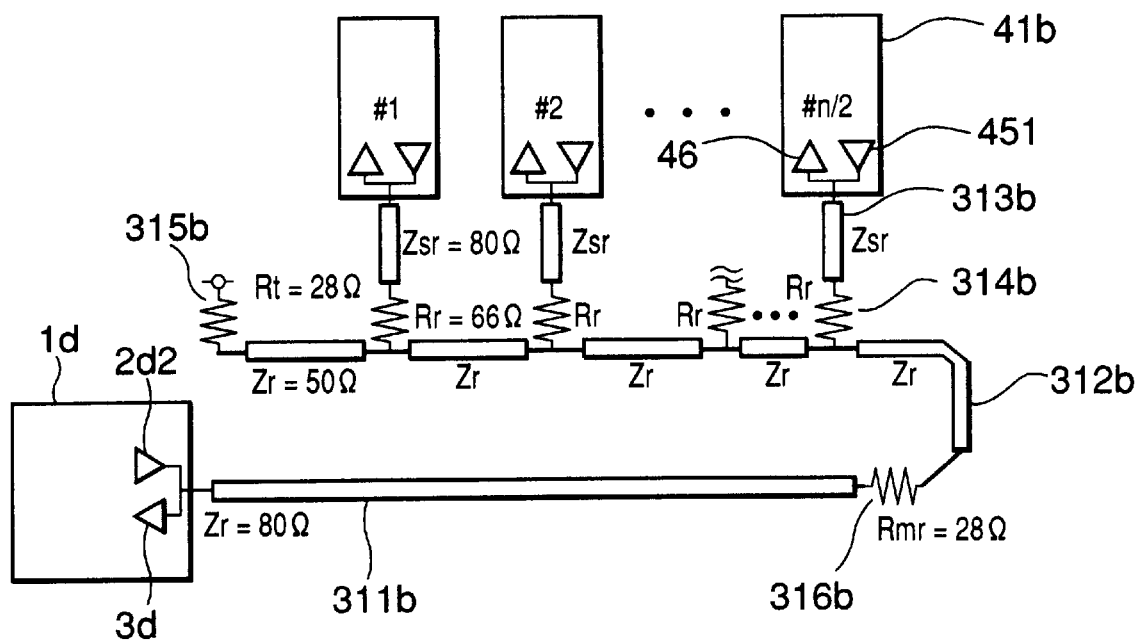
FIG. 23 is a diagram showing a read data/write data bus of a synchronous memory system of a third embodiment according to the present invention.
Figure 24:
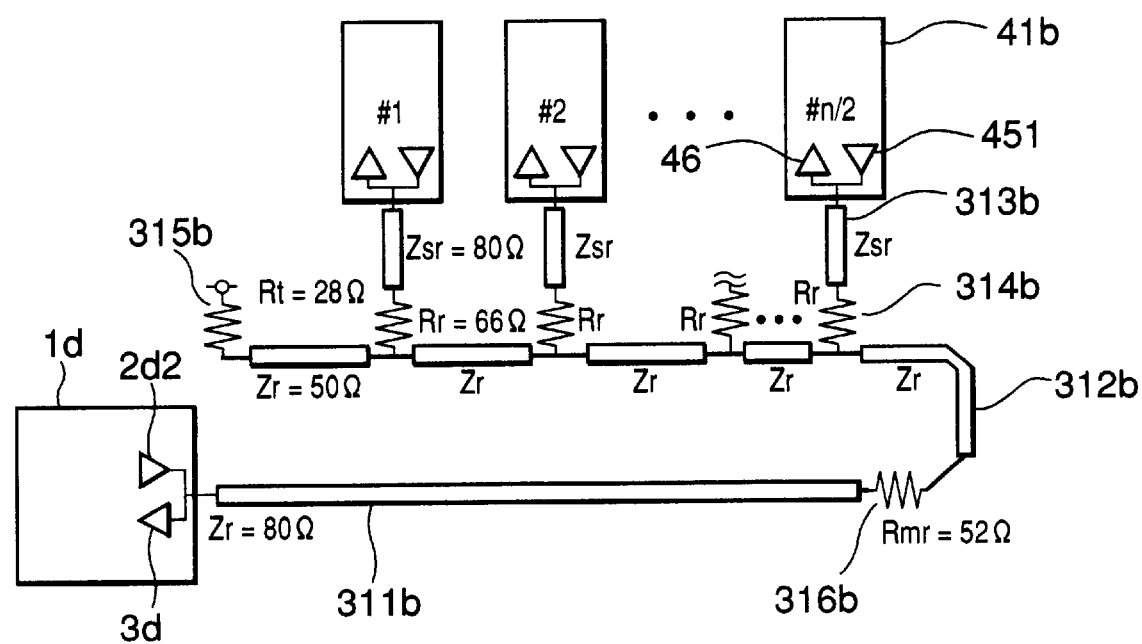
FIG. 24 is another diagram showing the read data/write data bus of the synchronous memory system of the third embodiment.
Figure 26A:
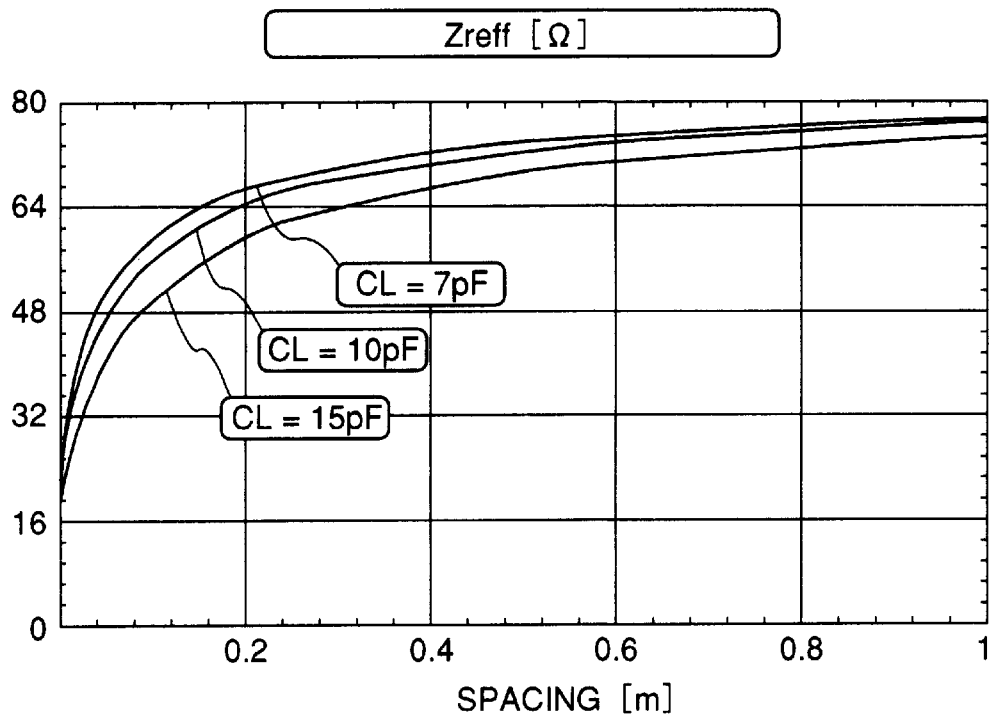
FIGS. 26A and 26B are diagrams showing the variation of a characteristic impedance with respect to the variation of a load capacitance of the bus of the third embodiment.
Figure 26B:
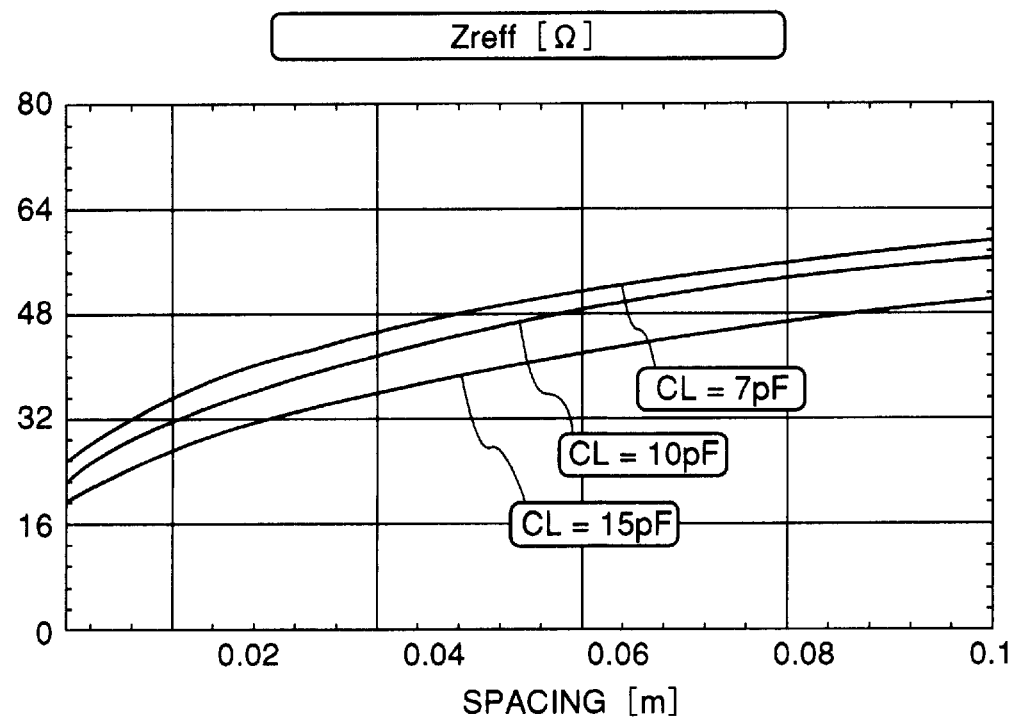

In this embodiment, the effective value of the characteristic impedance of a main line 312b of FIGS. 23 and 24 is reduced in accordance with the parasitic load capacitance CL of a memory element connected through a stub or the interval of connected stubs (shown in the abscissa of FIGS. 26A and 26B) as shown in FIG. 26.

In FIG. 23, Rmr of 316b is set to 28 Ω so that it is matched to the effective value 28 Ω of the characteristic impedance Zr of 312b under a specific condition. Likewise, Rt of a terminal resistor 315b is also set to 28 Ω. As show in FIG. 23, the main line 312b is connected to a resistor 316b of 28 Ω at one end thereof and to a terminal resistor 315b of 28 Ω. The stub is connected through a matching resistor Rr 314b. The matching resistor Rr of 314b has a resistance value of 66 Ω which is calculated from the following equation in order to perform matching with the effective value (Zreff) of the characteristic impedance Zr:

$$Rr=Zsr-(Zreff)/2$$

wherein Zsr represents a characteristic impedance of stub line 313b.

In this construction, the signal amplitude of the propagation waveform on the main line 312b is calculated from the sum of the source impedance Rsrc of an output driver 2d2 of an LSI 1d serving as a memory controller and Rmr of the resistor 316b, and the divisional resistance ratio in a series resistance circuit of the terminal resistor Rt. The source impedance Rsrc is dispersed in the range of 6 (min) Ω–12 (typ) Ω–24 (max) Ω in the manufacturing process.

If Rsrc=6 Ω, the signal amplitude is approximately 1.49 v from the following equation:

$$(Vdd \times Rt)/(Rsrc+Rme+Rt)$$

Since Vin (defined in SSTL)=825 to 660 mv, it has a sufficient noise margin for Vin as defined in SSTL. That is, in this construction, the SSTL-compatible propagation waveform arrives at any memory element 41b.

The driving current Idrv of the output driver 2d2 of the LSI 1d serving as the memory controller is calculated as follows:

$$Idrv=Vtt+(Rsrc+Rmr+Rt)\approx24 \text{ mA}$$

This driving current is approximately equal to the maximum driving current of the output buffer of general CMOS LSI, and this shows that the third embodiment of the presents invention is applicable to a general CMOS LSI.

Next, the difference of FIG. 24 from FIG. 23 will be described.

In FIG. 24, the resistance value Rmr of the resistor 316b is equal to 52 Ω. On the basis of the effective impedance Zreff of the characteristic impedance Zr of the main line 312b and Zr of the stub 311b, Rmr is calculated from the following equation:

$$Zr=Rmr+Zreff$$

Impedance matching at the connection point between the main line 312b and the stub 311b is performed by Rmr.

Figure 25:
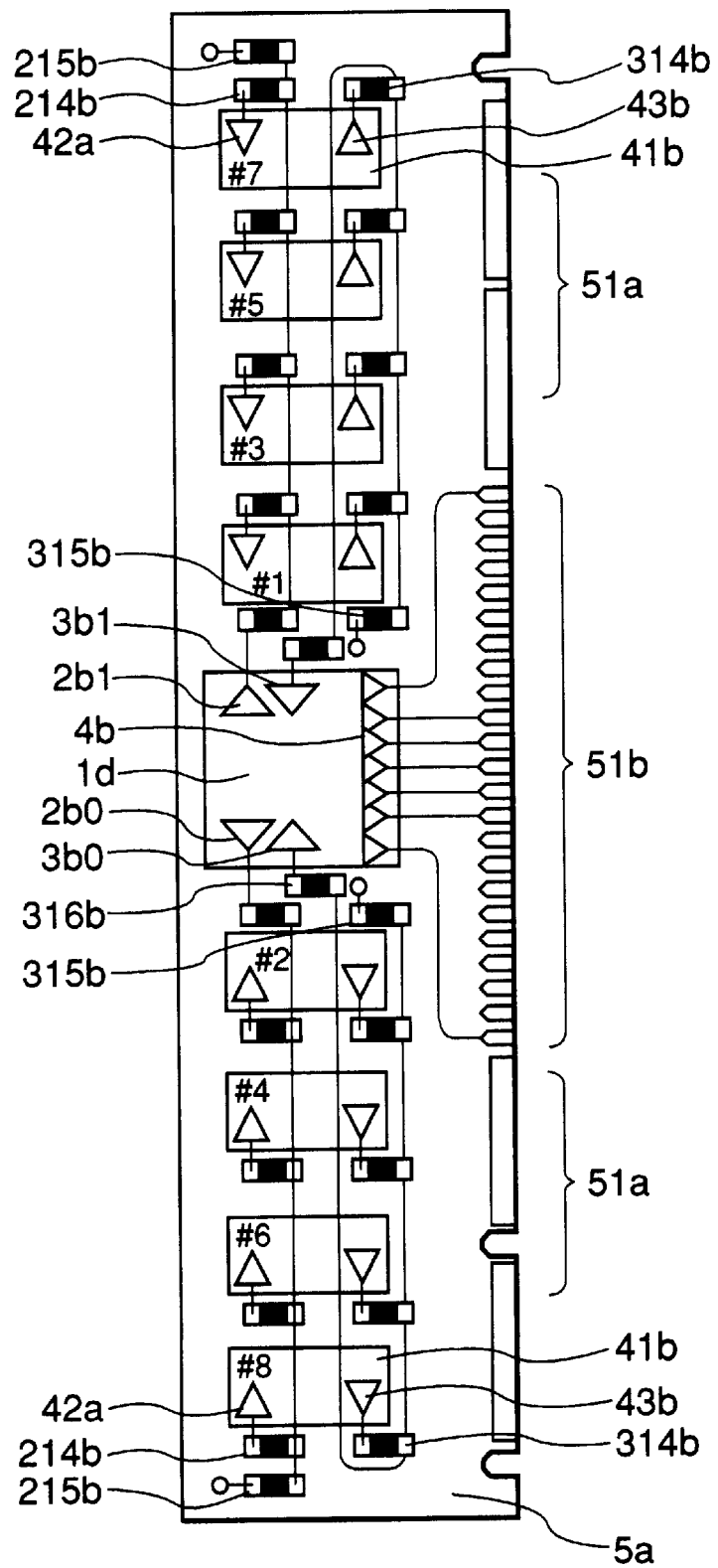
FIG. 25 is a diagram showing a memory riser card in which the synchronous memory system of the third embodiment is installed.

FIG. 25 shows a memory riser card in which the buses shown in FIGS. 23 and 24 are mounted. In FIG. 25, memory elements 41b are disposed at upper and lower sides of the memory controller 1d disposed at the center of the memory riser card, and an address command control clock bus and a data bus are disposed in this order from the lower side between the memory controller 1d and the memory elements 41b. In order to simplify the construction, the buses are illustrated one by one.

The buses which are located between the memory controller 1d and the memory elements 41b at the upper half side of the memory riser card will be described. The address command control clock bus which is output from the output buffer 2b1 of the memory controller 1d is connected to each memory element 41b through the corresponding matching resistor 214b, and connected to a terminal resistor 215b at the upper end portion of the memory riser card. The construction of this embodiment is similar to that of FIG. 23.

The data bus is extended from a terminal resistor 315b located in the vicinity of the memory controller 1d. The data bus is connected to the memory element 41b through the matching resistor 314b, turned up at the upper end portion and then connected through the matching resistor 315b in the vicinity of the memory controller 1d to the memory controller 1d. The arrangement of the bus and the memory elements as described above is applicable to the lower half side of the memory riser card so that the arrangements of the upper and lower half sides of the memory riser card are linearly symmetrical with respect to the memory controller 1d, and thus the description on the arrangement of the lower half side is omitted.

FIGS. 26A and 26B show the parasitic load capacitance of the memory element and the relationship of the interval of the connected stubs with respect to the effective impedance Zreff shown in FIGS. 23, 26A and 26B. In general, the characteristic impedance Z0 of the main line is determined on the basis of the structural distance and the properties of the metal conductor and insulating films of a printed circuit board. In FIGS. 26A and 26B, the characteristic impedance is set to 80 Ω.

The relationship of the effective value of the characteristic impedance Z0 and the parasitic capacitance is represented as follows:

$$Zreff=Z0\sqrt{C}/(C+CL)$$

where the stub capacitance in a stub interval is represented by C.

As shown in FIGS. 26A and 26B, as CL increases to 7, 10, 15 pF, the Zreff decreases. The dimension of CL is represented by [pF/unit], and the interval of the connected stubs is represented by [unit/pF]. Therefore, CL per unit length increases and Zreff decreases as the interval is reduced. Accordingly, in FIGS. 26A and 26B, Zreff falls toward the lower end. Since Zreff varies in accordance with the stub interval and the parasitic capacitance of the memory as shown in FIGS. 26A and 26B, Zreff may be calculated from the actual value to calculate Rmr and Rt.

Next, a fourth embodiment according to the present invention will be described with reference to FIGS. 27 to 31.

The difference of FIG. 27 from the third embodiment will be described.

Figure 27:
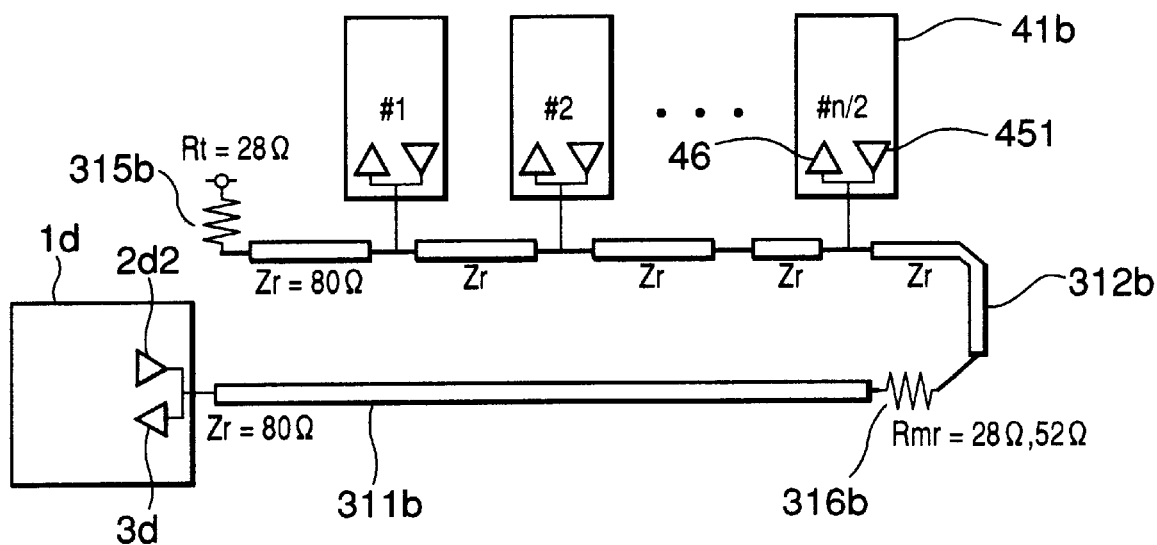
FIG. 27 is a diagram showing the read data/write data bus of a synchronous memory system of a fourth embodiment of the present invention.

In FIG. 27, any memory element 41b is directly connected to the main line 312b. That is, a metal pattern of a printed circuit board to which the memory elements 41b are soldered, that is, a so-called foot (print) pattern is followed by a printed circuit wiring of the main line 312b. In this construction, the effective value of the characteristic impedance Zr of the main line 312b is reduced in accordance with the relationship of the third embodiment as shown in FIGS. 26A and 26B. Accordingly, the terminal resistor Rt 315b and the matching resistor Rmr 316b have numerical values which are determined on the basis of the same principle as the third embodiment of the present invention. Therefore, the signal amplitude shown in the third embodiment is input to the memory element 41b of the fourth embodiment of the present invention to implement SSTL compatibility. With this construction, the matching resistor 314b of the third embodiment of the present invention is omitted.

Figure 28:
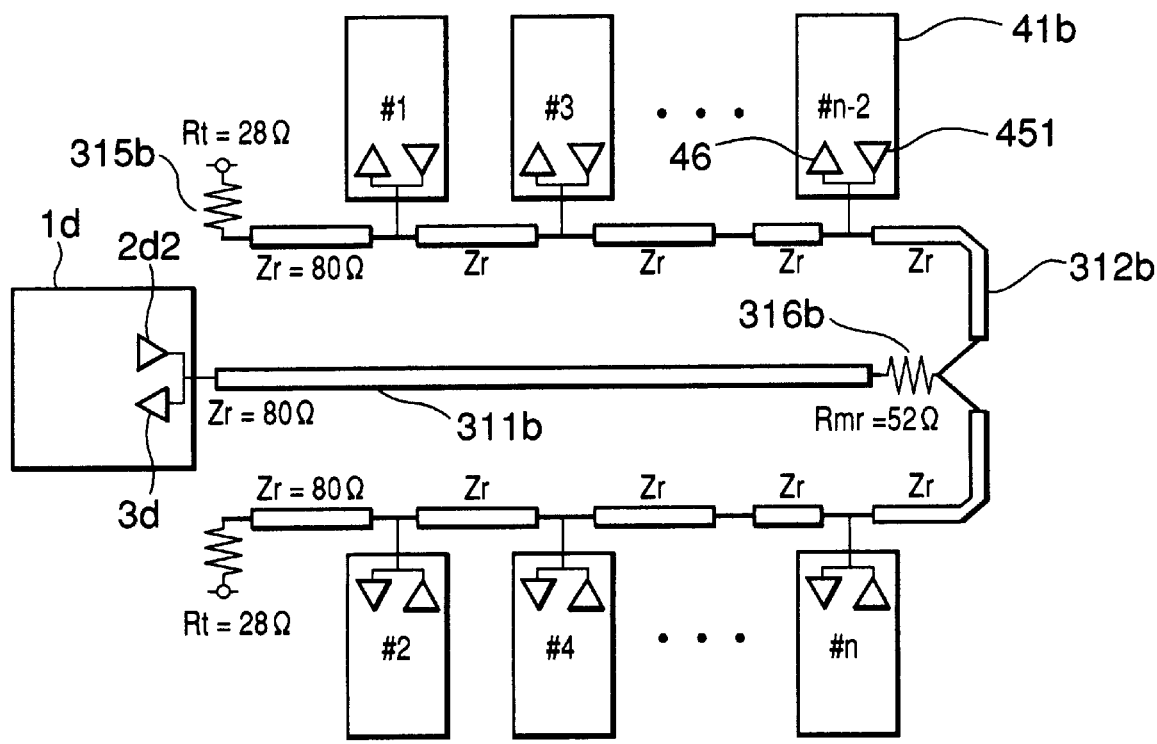
FIG. 28 is another diagram showing the read data/write data bus of the synchronous memory system of the fourth embodiment.

FIG. 28 shows the construction in which the main line 312b shown in FIG. 27 is applied to the second embodiment of the present invention. The terminal resistor 315b is matched to the effective value of the characteristic impedance Zr of the main line. In this construction, the resistor 316b at the position of the matching resistor is set to 52 Ω. If it is a matching resistor, it is reasonable for the resistance value thereof to be set to about 66 Ω, but, it is set to about 52 Ω in this construction. When the LSI 1d serving as the memory controller is a bus master, the signal amplitude on the main line 312b is intensified, and it is equal to about 800 mV, so that an increase of the noise margin can be expected. In addition, the compatibility with SSTL can be maintained.

Figure 29:
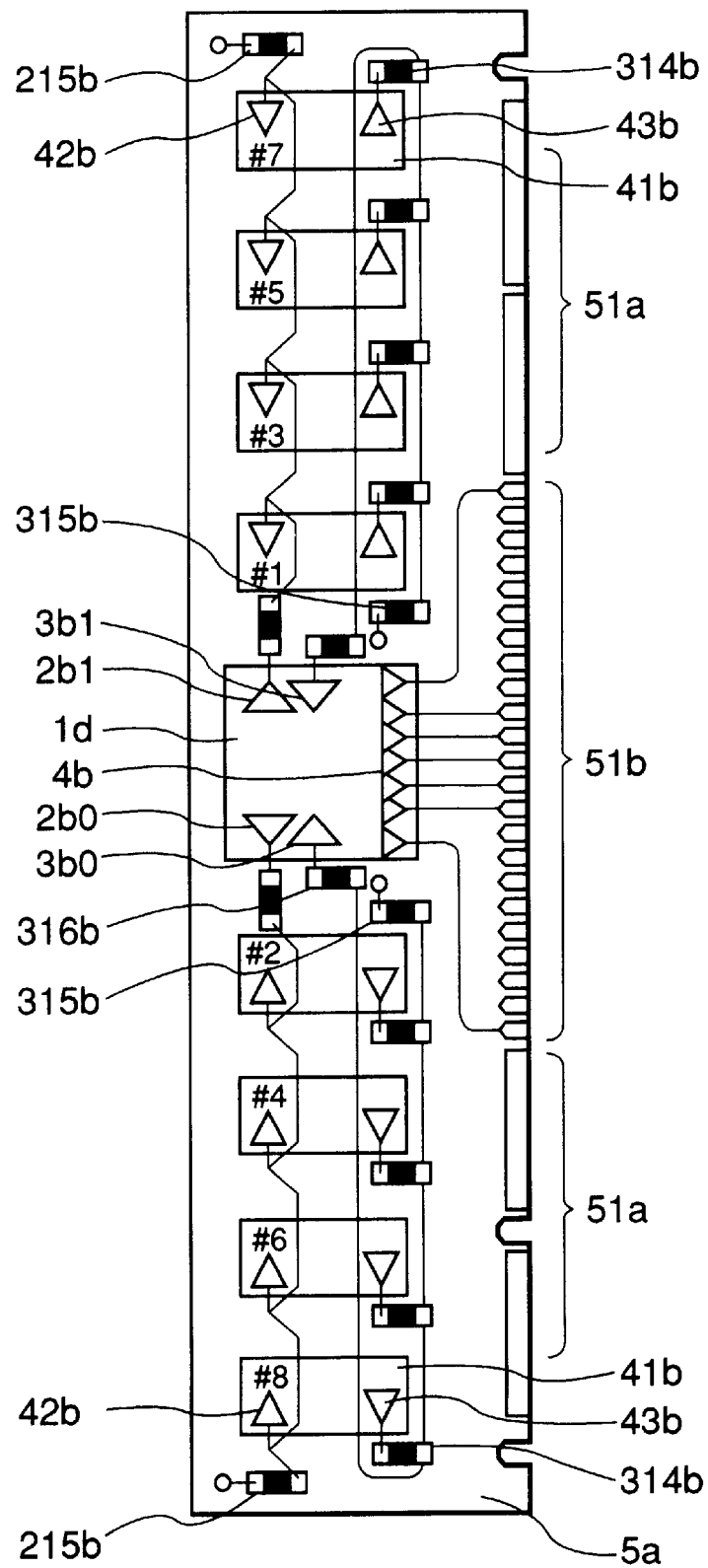
FIG. 29 is a diagram showing the memory riser card in which the synchronous memory system of the fourth embodiment is installed.

FIG. 29 shows the construction of the memory riser card in which the circuit wiring on the printed circuit board shown in FIG. 27 is implemented. The difference of FIG. 29 from FIG. 25 in the third embodiment of the present invention will be described.

In FIG. 29, memory elements are disposed at the upper and lower sides of the memory controller 1d which is disposed at the center of the memory riser card, and the address command control clock bus and the data bus are wired in this order from the lower side between the memory controller 1d and the memory elements. In FIG. 29, in order to simplify the construction, the buses are illustrated one by one.

First, the buses located between the memory controller 1d and the memory elements at the upper half side of the memory riser card will be described.

A printed circuit wiring follows a foot print to which the memory elements 42b are soldered so that the memory elements 42b are directly connected to the address command control clock bus output from the output buffer 2b1 of the memory controller 1d. The address command control clock bus is connected to a terminal resistor 215b at the upper end portion of the memory riser card.

Figure 30:
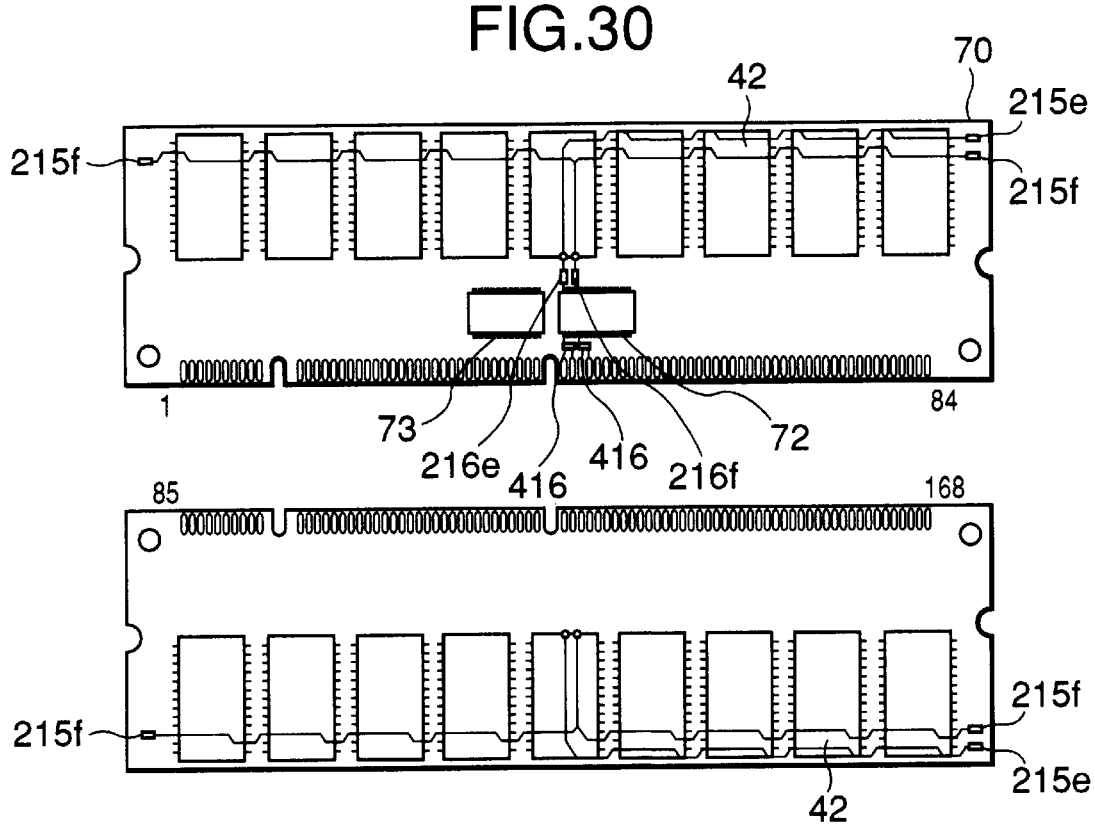
FIG. 30 is a diagram showing the construction of a memory module which is used for the synchronous memory system of the fourth embodiment.

FIG. 30 shows the construction a memory module (DIMM: Dual In-line Memory Module) to which the fourth embodiment of the present invention is applied. In FIG. 30, reference numeral 70 represents a module, reference numeral 42 represents a synchronous DRAM (memory element), reference numeral 72 represents an address buffer, reference numeral 73 represents a clock buffer, reference numerals 215e and 215f represent terminal resistors, reference numeral 216e and 216f represents resistors, and reference numeral 416 represents a matching resistor inserted between the address command control clock buses at the memory system side. FIG. 30 shows the address command control clock bus between the address buffer 72 and the memory elements on the memory module 70. The signal line output from the address buffer 72 is extended through a resistor 216e to a via hole. The signal line is branched to the obverse surface and the back surface at the via hole. The signal line on the obverse surface is directly erected, connected to five memory elements 42 and then reaches the terminal resistor 215e. The signal line on the back surface is likewise connected to four memory elements 42, and then reaches the terminal resistor 215e. Any memory element 42 receives an electrical signal having a signal amplitude which is introduced from the divisional resistance ratio in a series resistance circuit of the resistor 216e and the terminal resistor 215e.

Likewise, the signal line emitted from the address buffer 72 extends through the resistor 216f to the via hole. The signal line at the via hole is branched to the obverse surface and the reverse surface. The signal line on the obverse surface is directly erected and branched to two parts at the sides. The left-branched part is connected to four memory elements 42 at the left side and reaches the terminal resistor 215f while the right-branched part is connected to five memory elements 42 and reaches the terminal resistor 215f. The signal line on the back surface which is branched from the via hole is directly erected to two parts at the right and left sides. The lower-branched part is connected to five memory elements 42 and reaches the terminal resistor 215f while the right-branched part is connected to four memory elements 42 and reaches the terminal resistor 215f. Any memory element 42 receives an electrical signal having a signal amplitude which is introduced from the divisional resistance ratio in the series resistance circuit of the resistor 216f and the terminal resistor 215f.

Figure 31:
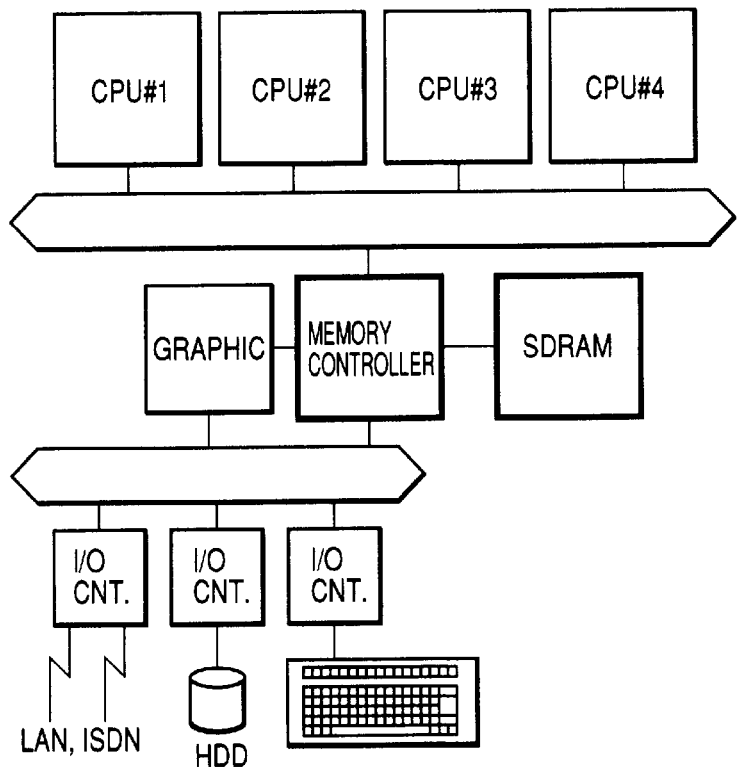
FIG. 31 is a diagram showing an information processing device in which the synchronous memory system of the embodiment according to the present invention is installed.

FIG. 31 shows an information processing device in which the memory system of the embodiment of the present invention is mounted.

The information processing device includes a multiprocessor bus to which four CPUs and a memory controller are connected, and an I/O bus through which a graphic controller and an I/O controller are connected to the memory controller. The memory system of the present invention comprises the memory controller and a synchronous DRAM (SDRAM). A special bus is provided between the memory controller and the graphic controller. Accordingly, data transmission can be performed irrespective of the overhead of protocol conversion of the I/O bus and the degree of congestion of the bus, so that high-speed data transmission from the memory system to the graphic controller can be implemented.

According to the memory system of the present invention, the memory system bus for which impedance matching is performed can be implemented, and thus the high-speed operation of the memory system can be expected. Particularly, by applying the above construction, high-speed data supply can be performed on the four CPUs of the multiprocessor design as well as the graphic controller.

As described above, according to the present invention, the signal transmission time between the bus master and each of the plural bus slaves controlled by the bus master can be shortened while being kept substantially constant, without increasing the number of pins of the bus masters.

What is claimed is:

1. A bus system having plural bus slaves, a bus master for controlling said plural bus slaves, a first bus for inputting signals output from said bus master to said bus slaves, and a second bus for inputting signals output from said bus slaves to said bus master, wherein each of said first and second buses includes:
  a main line connected to said bus master; and
  plural stub lines each of which is connected to said main line and connected to at least one sub line connected to said bus slave, and
wherein each of said bus slaves is connected to the corresponding stub line through said sub line so that the sum of the length of said first bus between said bus slave and said bus master and the length of said second bus between said bus slave and said bus master is substantially equal among all of said bus slaves, whereby the sum of the data transferring period from said bus master to said bus slave on said first bus and the data transferring period from said bus slave to said bus master on said second bus is substantially equal among all of said bus slaves.

2. The bus system as claimed in claim 1, wherein impedance matching is performed such that the signal output from said bus master produces no reflection wave at the connection points between said main line and each of said plural stub line of said first bus.

3. The bus system as claimed in claim 2, wherein said main line of said first bus is connected to said plural stub lines through a matching load.

4. The bus system as claimed in claim 1, wherein impedance matching is performed so that the signals output from said bus slaves produce no reflection wave at the connection point between said main line and each of said plural stub lines of said second bus.

5. The bus system as claimed in claim 4, wherein each of said plural stub lines of said second bus is connected to said main line through a matching load.

6. The bus system as claimed in claim 1, wherein impedance matching is performed so that a reflection wave occurring when the signals output from said plural bus slaves are input to said bus master produces no reflection wave again at the connection point between said main line and said plural stub lines of said second bus.

7. The bus system as claimed in claim 6, wherein said main line of said second bus is connected to each of said plural stub lines through a matching load.

8. The bus system as claimed in claim 1, wherein each of said plural bus slaves is connected to said main line of said second bus through sub line; and impedance matching is performed so that the signals output from each of said bus slaves produces no reflection wave at the connection point between said sub line connected to said bus slave and said stub line connected to said sub line.

9. The bus system as claimed in claim 8, wherein said sub line is connected to said stub line through a matching load.

10. The bus system as claimed in claim 9, wherein said matching load connected between said sub line and said stub line corresponding to said sub line has a resistive component; and a resistor having a predetermined resistance ratio to the resistive component is connected to the terminal of said stub line.

11. The bus system as claimed in claim 9, wherein said matching load connected between said sub line and said stub line corresponding to said sub line has a resistive component; and said matching load forms an RC circuit in combination with a capacitive component of said bus slave connected to said sub line, said RC circuit having a time constant which is shorter than the bus cycle of signals propagating on said first bus and said second bus, and longer than a rise and fall time of the signals.

12. The bus system as claimed in claim 1, wherein each of said plural bus slaves is connected to said stub line of said first bus through a sub line; and impedance matching is performed so that a reflection wave occurring when signals output from said bus master is input to said bus slave, produces no reflection wave again at the connection point between said sub line connected to said bus slave and said stub line connected to said sub line.

13. The bus system as claimed in claim 12, wherein said sub line is connected to said stub line through a matching load.

14. The bus system as claimed in claim 13, wherein said matching load connected between said sub line and said stub line corresponding to said sub line has a resistive component; and a resistor having a predetermined resistance ratio to the resistive component is connected to the terminal of said stub line.

15. The bus system as claimed in claim 13, wherein said matching load connected between said sub line and said stub line corresponding to said sub line has a resistive component; and said matching load forms an RC circuit in combination with a capacitive component of said bus slave connected to said sub line, said RC circuit having a time constant which is shorter than the bus cycle of signals propagating on said first bus and said second bus, and longer than a rise and fall time of the signals.

16. The bus system as claimed in claim 1, wherein the terminal of said stub line is connected to a matching load having an impedance which is substantially equal to the characteristic impedance of said stub line.

17. The bus system as claimed in claim 1, further including three matching resistors on said first bus or second bus, said matching resistors being inserted into a dividing point which is connected to any one of said plural bus slaves to be bifurcated into two parts, wherein said three matching resistors are connected to one another with the dividing point at the center, one of said three matching resistors is connected to bus wiring at the bus slave side,; another one is connected to bus wiring at one branched bus master side, and the other is connected to bus wiring at the other branched bus master side; and the impedance of each bus wiring is set to be matched with the composite impedance when viewed from said bus wiring to the dividing point.

18. The bus system as claimed in claim 17, wherein the resistance value of said three matching resistors is derived from the impedance value (Zm) of the bus wiring at the bus master side and the impedance value (Zs) of the bus wiring at the bus wiring at the bus slave side, and the resistance value (Rsplite-s) of one of the three matching resistors, which is inserted between the dividing point and the bus wiring at the bus slave side, is derived from the following equation:

$$Rsplite\text{-}s = (4Zs - 3 \times Zm) \times Zs / (4 \times Zs - Zm)$$

and the resistance value (Rsplite-m) of each of the other two matching resistors which are inserted between the dividing point and the bus wiring at the bus master side, is derived from the following equation:

$$Rsplite\text{-}m = Zm \times Zm / (4 \times Zs - Zm)$$

19. The bus system as claimed in claim 1, further including two matching resistors on said first bus or second bus, said matching resistors being inserted into a dividing point which is connected to any one of said plural bus slaves to be bifurcated into two parts, wherein said two matching resistors are connected to one another with the dividing point at the center, and one of said two matching resistors is connected to bus wiring at one branched bus master side, and the other is connected to bus wiring at the other branched bus master side; and the impedance of each bus wiring is set to be matched with the composite impedance when viewed from said bus wiring to the dividing point, and the impedance of the bus wiring at the bus slave side is set to be matched with the composite impedance when viewed from said bus wiring to the dividing point.

20. The bus system as claimed in claim 19, wherein the resistance value of said two matching resistors is equal to a half of the impedance value of the bus wiring at the bus master side; and the impedance value of the bus wiring at the bus slave side is equal to three-quarters of the impedance value of the bus wiring at the bus master side.

21. The bus system as claimed in claim 1, further including a series circuit comprising a transmission path on said first bus or said second bus on which signals is transmitted, a terminal resistor Rtt which terminates one end of said transmission path, and an LSI or said bus master which is connected to the other end of said transmission path through a resistor R, wherein a signal amplitude which is determined on the basis of the divisional resistance ratio in said series resistance circuit comprising said terminal resistor Rtt; said resistor R and a resistor (Rs) of a driving circuit of said LSI propagates on said transmission paths and the signal amplitude is substantially equal to or larger than the signal potential which is defined by SSTL (Stub Series Terminated Transceiver Logic).

22. The bus system as claimed in claim 21, wherein said terminal resistor Rtt is used in place of said resistor R and said LSI so that both ends of said transmission path are terminated by said Rtt.

23. A printed circuit board on which plural bus slaves and a bus master for controlling said bus slaves are mounted, and a first bus for inputting signals output from said bus master to said bus slaves and a second bus for inputting signals output from said bus slaves to said bus master are formed, wherein said bus master is disposed substantially at the center of said printed circuit board and said plural bus slaves are divided into two groups so that the respective groups are disposed substantially symmetrically at right and left sides with respect to said bus master, and wherein said first bus includes:

first stub line which is connected to sub lines, each of which is connected to each of said bus slaves at the left side of said bus master;

a second stub line which is connected to sub lines, each of which is connected to each of said bus slaves at the right side of said bus master; and a first main line having one end portion which is connected to said bus master, and the other end portion which is connected to said first stub line and said second stub line, said first and second stub lines being formed so as to be symmetricaal at the right and left sides with respect to said bus master, and wherein said second bus includes:

a third stub line which is connected to sub lines, each of which is connected to each of said bus slaves at the left side of said bus master in the opposite connection order to said first stub line;

a fourth stub line which is connected to sub lines, each of which is connected to each of said bus slaves at the right side of said bus master in the opposite connection order to said second stub line; and a second main line having one end portion which is connected to said bus master, and the other end portion which is connected to said third stub line and said fourth stub line, said third and fourth stub lines being formed so as to be symmetricaal at the right and left sides with respect to said bus master, whereby the sum of the data transferring period from said bus master to said bus slave on said first bus and the data transferring period from said buys slave to said bus master on said second bus is substantially equal among all or said bus slaves.

24. The printed circuit board as claimed in claim 23, wherein said first and second buses are formed by using a conductive layer which is formed in a layer form.

25. The printed circuit board as claimed in claim 23, wherein each said stub line has one end which is terminated by a terminal resitor Rtt, the resistance value of said terminal resistor Rtt being derived from the following equation:

$$Rtt = X \times sqrt(C/(C+CL))$$

where the characteristics impedance of each said stub line is represented by sqrt (L/C), and the parasitic capacitance of said bus slaves connected to each said stub line is represented by CL.

26. The printed circuit board as claimed in claim 25, wherein each said stub line is connected through a matching resistor Rm to the corresponding main line, and when the characteristic impedance of said main line is represented by Zs, the resistance value of said matching resistor Rm is derived from the following equation:

$$Rm = Zs - Z \times sqrt(C/(C+CL))/2 \text{ or}$$

$$Rm = Zs - Rtt/2$$

27. The printed circuit board as claimed in claim 23, further including a series comprising a transmission path on said first bus or said second bus on which signals are transmitted, a terminal resistor Rtt which terminates one end of said transmission path, and an LSI as said bus master which is connected to the other end of said transmission path through a resistor R, wherein a signal amplitude which is determined on the basis of the divisional resistance ratio in said series resistance circuit comprising said terminal resistor Rtt; said resistor R and a resistor (Rs) of a driving circuit of said LSI propagates on said transmission path, and the signal amplitude is substantially equal to or larger than the signal potential which is defined by SSTL (Stub Series Terminated Transceiver Logic). , wherein each said stub line is connected through a matching resistor Rm to the corresponding main line, and when the characteristic impedance of said main line is represented by

* * * * *